(12) United States Patent
Huang

(10) Patent No.: US 11,262,542 B2
(45) Date of Patent: Mar. 1, 2022

(54) PHOTOGRAPHING OPTICAL LENS ASSEMBLY, IMAGE CAPTURING DEVICE AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 224 days.

(21) Appl. No.: 16/442,697

(22) Filed: Jun. 17, 2019

(65) Prior Publication Data

US 2019/0302426 A1    Oct. 3, 2019

Related U.S. Application Data

(63) Continuation of application No. 15/638,592, filed on Jun. 30, 2017, now Pat. No. 10,371,927, which is a continuation of application No. 14/684,590, filed on Apr. 13, 2015, now Pat. No. 9,726,858.

(30) Foreign Application Priority Data

Dec. 30, 2014 (TW) .................................. 103146329

(51) Int. Cl.
    *G02B 13/00*    (2006.01)
    *G02B 13/18*    (2006.01)
    *G02B 9/62*     (2006.01)
(52) U.S. Cl.
    CPC ........... *G02B 13/0045* (2013.01); *G02B 9/62* (2013.01); *G02B 13/0015* (2013.01); *G02B 13/18* (2013.01)

(58) Field of Classification Search
    CPC ........... G02B 13/0045; G02B 13/0015; G02B 13/18; G02B 9/62
    USPC ....................................................... 348/335
    See application file for complete search history.

(56) References Cited

U.S. PATENT DOCUMENTS

| | | |
|---|---|---|
| 2,164,028 A | 6/1939 | Berek |
| 2,394,635 A | 2/1946 | Reiss |
| 2,394,959 A | 2/1946 | Wynne |
| 2,502,509 A | 4/1950 | Cook |
| 2,502,543 A | 4/1950 | Warmisham |
| 2,649,021 A | 8/1953 | Angenieux |
| 3,800,085 A | 3/1974 | Ambats et al. |

(Continued)

FOREIGN PATENT DOCUMENTS

| | | |
|---|---|---|
| CN | 101387739 A | 3/2009 |
| CN | 101387740 A | 3/2009 |

(Continued)

*Primary Examiner* — Collin X Beatty
(74) *Attorney, Agent, or Firm* — McClure, Qualey & Rodack, LLP

(57) ABSTRACT

A photographing optical lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element has refractive power. Each of the third through sixth lens elements has refractive power and an object-side surface and an image-side surface being both aspheric. The photographing optical lens assembly has a total of six lens elements with refractive power.

28 Claims, 21 Drawing Sheets

(56) References Cited

U.S. PATENT DOCUMENTS

| | | | |
|---|---|---|---|
| 3,868,173 A | 2/1975 | Miles et al. | |
| 4,165,916 A | 8/1979 | Nakamura | |
| 4,394,073 A | 7/1983 | Wakamiya | |
| 4,530,575 A | 7/1985 | Yamakawa | |
| 4,682,862 A | 7/1987 | Moskovich | |
| 4,929,066 A | 5/1990 | Wakimoto et al. | |
| 5,029,994 A | 7/1991 | Aoki | |
| 5,513,042 A | 4/1996 | Itoh et al. | |
| 5,642,229 A | 6/1997 | Kaneko et al. | |
| 5,699,202 A | 12/1997 | Yamamoto | |
| 5,798,874 A | 8/1998 | Yamamoto | |
| 7,787,196 B2 | 8/2010 | Asami et al. | |
| 7,889,442 B2 | 2/2011 | Suzuki et al. | |
| 8,335,043 B2 | 12/2012 | Huang | |
| 8,379,323 B2 * | 2/2013 | Huang | G02B 13/0045 359/713 |
| 8,861,095 B2 * | 10/2014 | Kubota | G02B 9/62 359/713 |
| 9,285,568 B2 | 3/2016 | Yamazaki et al. | |
| 2007/0229983 A1 | 10/2007 | Saori | |
| 2012/0212842 A1 | 8/2012 | Hosoi et al. | |
| 2015/0085378 A1 | 3/2015 | Jung et al. | |
| 2015/0109685 A1 | 4/2015 | Shinohara et al. | |
| 2015/0146086 A1 | 5/2015 | Liao | |
| 2015/0146309 A1 | 5/2015 | Ota | |
| 2015/0177483 A1 | 6/2015 | You | |
| 2015/0247989 A1 | 9/2015 | Sakai | |
| 2015/0248016 A1 | 9/2015 | Sakai | |
| 2015/0277085 A1 * | 10/2015 | Noda | G02B 13/0045 359/713 |
| 2015/0362702 A1 | 12/2015 | Tang et al. | |
| 2016/0004044 A1 | 1/2016 | Kubota et al. | |
| 2016/0131872 A1 | 5/2016 | Tang et al. | |
| 2016/0131873 A1 | 5/2016 | Tang et al. | |
| 2016/0170182 A1 | 6/2016 | Tanaka | |

FOREIGN PATENT DOCUMENTS

| | | |
|---|---|---|
| CN | 202256844 U | 5/2012 |
| CN | 103576297 A | 2/2014 |
| CN | 103676088 A | 3/2014 |
| CN | 105278085 A | 1/2016 |
| JP | 48043328 | 6/1973 |
| JP | 50-062631 A | 5/1975 |
| JP | 53-010425 A | 1/1978 |
| JP | 53129629 | 11/1978 |
| JP | 54044554 A | 4/1979 |
| JP | S5695207 A | 8/1981 |
| JP | 57-186728 A | 11/1982 |
| JP | 58-139111 A | 8/1983 |
| JP | 58215619 A | 12/1983 |
| JP | S58224322 A | 12/1983 |
| JP | 60-098417 A | 6/1985 |
| JP | S60201313 A | 10/1985 |
| JP | 1986-067814 | 4/1986 |
| JP | S61-67814 A | 4/1986 |
| JP | S6442617 A | 2/1989 |
| JP | H01129217 A | 5/1989 |
| JP | H01129218 A | 5/1989 |
| JP | 01-263611 A | 10/1989 |
| JP | H02-59735 A | 2/1990 |
| JP | H04124607 A | 4/1992 |
| JP | H07-84183 A | 3/1995 |
| JP | 07181380 A | 7/1995 |
| JP | 09-033803 A | 2/1997 |
| JP | 10325921 A | 12/1997 |
| JP | H10221601 A | 8/1998 |
| JP | 10307254 A | 11/1998 |
| JP | 10-319319 A | 12/1998 |
| JP | 2009069369 A | 4/2009 |
| JP | 2009086644 A | 4/2009 |
| JP | 2012173299 A | 9/2012 |
| JP | 2013-242449 A | 12/2013 |
| JP | 2014-010399 | 1/2014 |
| JP | 2014092583 | 5/2014 |
| JP | 2015163926 A | 9/2015 |
| JP | 2015163928 A | 9/2015 |
| JP | 2016114803 A | 6/2016 |
| TW | 201415070 A | 4/2014 |
| WO | 2014-155468 A1 | 10/2014 |

* cited by examiner

PHOTOGRAPHING OPTICAL LENS ASSEMBLY, IMAGE CAPTURING DEVICE AND ELECTRONIC DEVICE

RELATED APPLICATIONS

The present application is a continuation of U.S. application Ser. No. 15/638,592, filed Jun. 30, 2017, now U.S. Pat. No. 10,371,927, which is a continuation of U.S. application Ser. No. 14/684,590, filed Apr. 13, 2015, now U.S. Pat. No. 9,726,858 issued on Aug. 8, 2017, which claims priority to Taiwan Application Serial Number 103146329, filed Dec. 30, 2014, all of which are herein incorporated by reference.

BACKGROUND

Technical Field

The present disclosure relates to a photographing optical lens assembly and an image capturing device. More particularly, the present disclosure relates to a compact photographing optical lens assembly and image capturing device applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure or a five-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with six-element lens structure enhance image quality and resolution. However, the arrangement of the refractive power of the first lens element of the conventional compact optical systems cannot provide the light focusing ability on the object side thereof. Therefore, the volume and the total track length would be excessive.

SUMMARY

According to one aspect of the present disclosure, a photographing optical lens assembly includes, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element has refractive power. The third lens element with refractive power has an object-side surface and an image-side surface being both aspheric. The fourth lens element with refractive power has an object-side surface and an image-side surface being both aspheric. The fifth lens element with refractive power has an object-side surface and an image-side surface being both aspheric. The sixth lens element with refractive power has an object-side surface and an image-side surface being both aspheric. The photographing optical lens assembly has a total of six lens elements with refractive power, and there is no relative displacement among the lens elements with refractive power. When a focal length of the photographing optical lens assembly is f, an axial distance between the object-side surface of the first lens element and the image-side surface of the sixth lens element is TD, an axial distance between the image-side surface of the sixth lens element and an image surface is BL, and a maximum image height of the photographing optical lens assembly is ImgH, the following conditions are satisfied:

$0.30 < TD/f < 0.90;$ $0 < BL/f < 0.25;$ and $2.0 < f/ImgH < 5.0.$

According to another aspect of the present disclosure, an image capturing device includes the photographing optical lens assembly according to the aforementioned aspect and an image sensor, wherein the image sensor is disposed on the image surface of the photographing optical lens assembly.

According to further another aspect of the present disclosure, an electronic device includes the image capturing device according to the aforementioned aspect.

According to yet another aspect of the present disclosure, a photographing optical lens assembly includes, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element has refractive power. The third lens element with refractive power has an object-side surface and an image-side surface being both aspheric. The fourth lens element with refractive power has an object-side surface and an image-side surface being both aspheric. The fifth lens element with refractive power has an object-side surface and an image-side surface being both aspheric. The sixth lens element with refractive power has an object-side surface and an image-side surface being both aspheric. The photographing optical lens assembly has a total of six lens elements with refractive power, there is an air space between any two lens elements of the first lens element, the second lens element, the third lens element, the fourth lens element, the fifth lens element and the sixth lens element that are adjacent to each other, and there is no relative displacement among the lens elements with refractive power. The photographing optical lens assembly further includes a stop, there is no lens element with refractive power between the stop and the first lens element. When a focal length of the photographing optical lens assembly is f, an axial distance between the object-side surface of the first lens element and the image-side surface of the sixth lens element is TD, and a maximum image height of the photographing optical lens assembly is ImgH, the following conditions are satisfied:

$0.30 < TD/f < 0.90;$ and $2.0 < f/ImgH < 5.0.$

According to still another aspect of the present disclosure, an image capturing device includes the photographing optical lens assembly according to the aforementioned aspect, a prism and an image sensor, wherein the prism is disposed on an optical path between an imaged object and the photographing optical lens assembly, and the image sensor is disposed on the image surface of the photographing optical lens assembly.

According to further another aspect of the present disclosure, a photographing optical lens assembly includes, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element has negative refractive power. The third lens element with refractive power has an object-side surface and an image-side surface being both aspheric. The fourth lens element with refractive power has an object-side surface and an image-side surface being both aspheric. The fifth lens element with refractive power has an object-side surface and an image-side surface being both aspheric. The sixth lens element with refractive power has an object-side surface and an image-side surface being both aspheric. The photographing optical lens assembly has a total of six lens elements with refractive power, and there is no relative displacement among the lens elements with refractive power. When a focal length of the photographing optical lens assembly is f, an axial distance between the object-side surface of the first lens element and the image-side surface of the sixth lens element is TD, and an axial distance between the image-side surface of the sixth lens element and an image surface is BL, the following conditions are satisfied:

$0.30 < TD/f < 0.85$; and $0 < BL/f < 0.25$.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
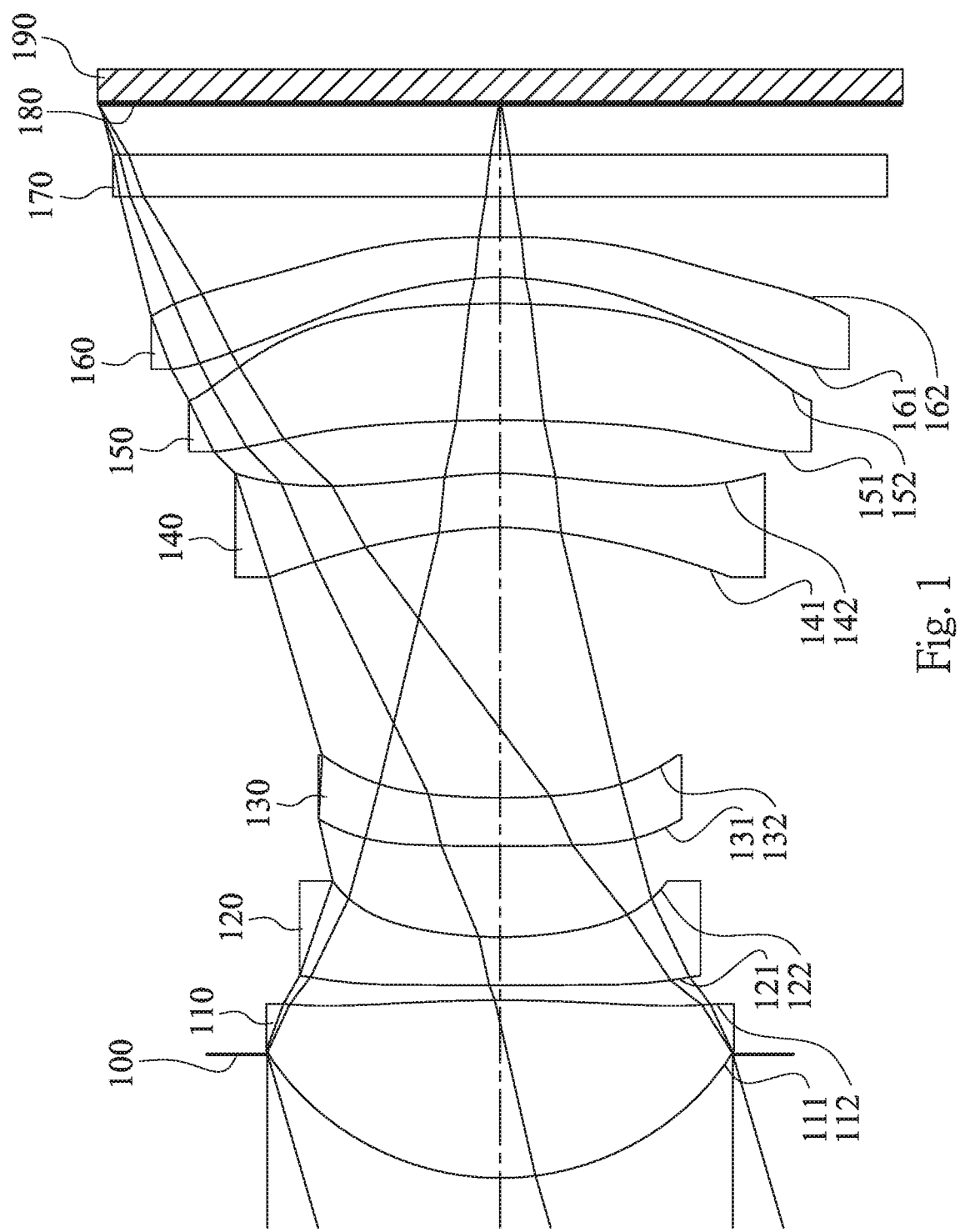
FIG. 1 is a schematic view of an image capturing device according to the 1st embodiment of the present disclosure.

A photographing optical lens assembly includes, in order from an object side to an image side, a first lens element, a second lens element, a third lens element, a fourth lens element, a fifth lens element and a sixth lens element, wherein the photographing optical lens assembly has a total of six lens elements with refractive power, and there is no relative displacement among the lens elements with refractive power. The photographing optical lens assembly further includes a stop, such as an aperture stop, wherein there is no lens element with refractive power between the stop and the first lens element.

There is an air space between any two lens elements of the first lens element, the second lens element, the third lens element, the fourth lens element, the fifth lens element and the sixth lens element that are adjacent to each other. That is, each of the first through sixth lens elements is a single and non-cemented lens element, and any two lens elements adjacent to each other are not cemented, and there is a space between the two lens elements. Moreover, the manufacturing process of the cemented lenses is more complex than the non-cemented lenses. In other words, of the first lens element, the second lens element, the third lens element, the fourth lens element, the fifth lens element and the sixth lens element of the photographing optical lens assembly, there is a space in a paraxial region between every pair of lens elements that are adjacent to each other. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the photographing optical lens assembly. Therefore, according to the photographing optical lens assembly of the present disclosure, an air space in a paraxial region between any two of the first lens element, the second lens element, the third lens element, the fourth lens element, the fifth lens element and the sixth lens element that are adjacent to each other of the present disclosure improves the problem generated by the cemented lens elements.

The first lens element with positive refractive power has an object-side surface being convex in a paraxial region thereof. Therefore, it is favorable for restricting the volume of the photographing optical lens assembly so as to obtain the compact size thereof by providing the light focusing ability on the object side thereof. Furthermore, the first lens element can have an image-side surface being convex in a paraxial region thereof and including at least one concave shape in an off-axial region thereof, so that the aberration of the off-axis field can be corrected.

The second lens element can have negative refractive power, and can have an image-side surface being concave in a paraxial region thereof. Therefore, the aberration of the photographing optical lens assembly can be corrected for enhancing the image quality.

The third lens element can have negative refractive power, and can have an image-side surface being concave in a paraxial region thereof. Therefore, the aberration of the photographing optical lens assembly can be corrected for enhancing the image quality.

The fifth lens element can have positive refractive power, and can have an object-side surface being concave in a paraxial region thereof and an image-side surface being convex in a paraxial region thereof. Therefore, the astigmatism of the photographing optical lens assembly can be reduced effectively.

The sixth lens element can have negative refractive power, and can have an object-side surface being concave in a paraxial region thereof and an image-side surface being convex in a paraxial region thereof, wherein the object-side surface of the sixth lens element can include at least one convex shape in an off-axial region thereof. Therefore, the principal point can be positioned away from the image surface of the photographing optical lens assembly so as to reduce the back focal length for keeping a compact size. Further, it is also favorable for reducing the incident angle of the off-axis field onto the image sensor so as to increase the responding efficiency of the image sensor.

According to the foregoing photographing optical lens assembly, at least two lens elements of the first lens element, the second lens element and the third lens element has an object-side surface being convex in a paraxial region thereof and an image-side surface being concave in a paraxial region thereof. Therefore, the astigmatism of the photographing optical lens assembly can be corrected.

According to the foregoing photographing optical lens assembly, each of the fourth lens element, the fifth lens element and the sixth lens element has a surface being concave in a paraxial region thereof and the other surface being convex in a paraxial region thereof. Therefore, the refractive power of the photographing optical lens assembly can be balanced and then the aberration thereof can be also corrected.

When a focal length of the photographing optical lens assembly is f, and an axial distance between the object-side surface of the first lens element and the image-side surface of the sixth lens element is TD, the following condition is satisfied: $0.30<TD/f<0.90$. It is favorable for controlling the arrangement of the lens elements effectively, and improving the telephoto ability. Preferably, the following condition can be satisfied: $0.30<TD/f<0.85$. More preferably, the following condition can be satisfied: $0.50<TD/f<0.85$.

When the focal length of the photographing optical lens assembly is f, and an axial distance between the image-side surface of the sixth lens element and an image surface is BL, and the following condition is satisfied: $0<BL/f<0.25$. Therefore, the back focal length of the photographing optical lens assembly can be reduced so as to avoid the excessive volume thereof which can thereby be favorable to be applied to the compact electronic device.

When the focal length of the photographing optical lens assembly is f, and a maximum image height of the photographing optical lens assembly is ImgH, the following condition is satisfied: $2.0<f/ImgH<5.0$. Therefore, it is favorable for enhancing the image capturing ability on a specific region and obtaining the excellent telephoto ability by controlling the incident light of the photographing optical lens assembly which can be focused on the specific region in the distance. Preferably, the following condition can be satisfied: $2.35<f/ImgH<4.5$.

When a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, and a maximum of N1, N2, N3, N4, N5 and N6 is Nmax, the following condition is satisfied: $Nmax<1.70$. Therefore, the aberration of the photographing optical lens assembly can be reduced.

When an Abbe number of the fifth lens element is V5, the following condition is satisfied: $V5<30$. Therefore, the chromatic aberration of the optical photographing lens assembly can be corrected.

The optical photographing lens assembly can further include a stop, wherein there is no lens element with refractive power between the stop and the first lens element. When an axial distance between the stop and the image-side surface of the sixth lens element is SD, and the axial distance between the object-side surface of the first lens element and the image-side surface of the sixth lens element is TD, the following condition is satisfied: $0.75<SD/TD<1.0$. Therefore, it is favorable for obtaining a balance between telecentricity and the functionality of wide viewing angle.

When a distance in parallel with an optical axis from an axial vertex on the image-side surface of the sixth lens element to a maximum effective radius position on the image-side surface of the sixth lens element is SAG62, and a central thickness of the sixth lens element is CT6, the following condition is satisfied: $SAG62+CT6<0$ mm. Therefore, the shape of the lens element is favorable for manufacturing and molding the lens elements.

When a curvature radius of the image-side surface of the fifth lens element is R10, a curvature radius of the object-side surface of the sixth lens element is R11, and the following condition is satisfied: $1.0<(R10+R11)/(R10-R11)<8.0$. Therefore, the astigmatism can be reduced.

When the focal length of the photographing optical lens assembly is f, a focal length of the first lens element is f1, a focal length of the second lens element is f2, and a focal length of the sixth lens element is f6, the following condition is satisfied: $5.0<|f/f1|+|f/f2|+|f/f6|$. Therefore, the total track length of the photographing optical lens assembly can be reduced by the distribution of the refractive power so as to maintain the compact size thereof.

When an entrance pupil diameter of the photographing optical lens assembly is EPD, and the maximum image height of the photographing optical lens assembly is ImgH, the following condition is satisfied: $0.8<EPD/ImgH<2.0$. Therefore, the sufficient light of the photographing optical lens assembly can be obtained.

When half of a maximal field of view of the photographing optical lens assembly is HFOV, the following condition is satisfied: $7.5$ degrees$<HFOV<23.5$ degrees. Therefore, the proper field of view and the proper image capturing range can be obtained for avoiding the stray light.

When a curvature radius of the object-side surface of the fourth lens element is R7, and a curvature radius of the image-side surface of the fourth lens element is R8, the following condition is satisfied: $-0.3<(R7-R8)/(R7+R8)<0.6$. Therefore, the astigmatism of the photographing optical lens assembly can be corrected.

When an axial distance between the stop and the object-side surface of the first lens element is Dsr1, and an axial distance between the stop and an image-side surface of the first lens element is Dsr2, the following condition is satisfied: $1.40<|Dsr1/Dsr2|$. Therefore, the light focusing ability of the first lens element can be enhanced.

When an axial distance between the object-side surface of the first lens element and the image surface is TL, and a maximum image height of the photographing optical lens assembly is ImgH, the following condition is satisfied: $2.0<TL/ImgH<3.0$. Therefore, the total track length of the photographing optical lens assembly can be reduced so as to maintain the compact size thereof.

When the axial distance between the object-side surface of the first lens element and the image-side surface of the sixth lens element is TD, and an axial distance between the image-side surface of the third lens element and the object-side surface of the fifth lens element is Dr6r9, the following condition is satisfied: $TD/Dr6r9<3.1$. Therefore, the total track length of the photographing optical lens assembly can be reduced so as to maintain the compact size thereof.

When a curvature radius of the object-side surface of the sixth lens element is R11, and a curvature radius of the image-side surface of the sixth lens element is R12, the following condition is satisfied: $(R11+R12)/(R11-R12)<-1.0$. Therefore, the photosensitivity of the photographing optical lens assembly can be reduced effectively.

When a sum of axial distances between each two lens elements of the first lens element, the second lens element, the third lens element, the fourth lens element, the fifth lens element and the sixth lens element which are adjacent to each other is $\Sigma AT$, and the axial distance between the object-side surface of the first lens element and the image-side surface of the sixth lens element is TD, the following condition is satisfied: $0.40<\Sigma AT/TD$. Therefore, the total track length of the photographing optical lens assembly can be reduced so as to maintain the compact size thereof.

When the focal length of the photographing optical lens assembly is f, a curvature radius of the object-side surface of the first lens element is R1, and a curvature radius of the image-side surface of the sixth lens element is R12, the following condition is satisfied: $4.0<f/R1-f/R12<8.5$. Therefore, the back focal length of the photographing optical lens assembly can be reduced for maintaining the compact size thereof.

According to the photographing optical lens assembly of the present disclosure, the lens elements thereof can be made of glass or plastic material. When the lens elements are made of glass material, the distribution of the refractive powers of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the photographing optical lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof.

According to the photographing optical lens assembly of the present disclosure, the positive refractive power or the negative refractive power of a lens element or the focal length of the lens element, that is, refers to the refractive power or the focal length in a paraxial region of the lens element.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, an image surface of the photographing optical lens assembly, based on the corresponding image sensor, can be flat or curved. In particular, the image surface can be a curved surface being concave facing towards the object side.

According to the photographing optical lens assembly of the present disclosure, an aperture stop can be configured as a front stop or a middle stop. A front stop disposed between an imaged object and the first lens element can provide a longer distance between an exit pupil of the photographing optical lens assembly and the image surface and thereby improves the image-sensing efficiency of an image sensor. A middle stop disposed between the first lens element and the image surface is favorable for enlarging the field of view of the photographing optical lens assembly and thereby provides a wider field of view for the same.

According to the photographing optical lens assembly of the present disclosure, the photographing optical lens assembly can be applied to 3D (three-dimensional) image capturing applications, in products such as digital cameras, mobile devices, digital tablets, smart TV, internet monitoring device, game consoles with motion sensing function, driving recording systems, rear view camera systems, and wearable devices.

According to the present disclosure, an image capturing device is provided. The image capturing device includes the aforementioned photographing optical lens assembly and an image sensor, wherein the image sensor is disposed on the image side of the aforementioned photographing optical lens assembly, that is, the image sensor can be disposed on or near an image surface of the aforementioned photographing lens system. In the image capturing device, the first lens element has positive refractive power, so that the volume of the photographing optical lens assembly can be restricted so as to obtain the compact size thereof by providing the light focusing ability on the object side thereof. Furthermore, the image capturing device can include a prism disposed on an optical path between an object and the photographing optical lens assembly. Therefore, the direction of the optical path can be changed by the prism so as to reduce the demanded height of the photographing optical lens assembly for obtaining the compact size of the image capturing device. Preferably, the image capturing device can further include a barrel member, a holding member or a combination thereof.

According to the present disclosure, an electronic device is provided. The electronic device includes the aforementioned image capturing device. Therefore, the image quality of the electronic device can be increased. Preferably, the electronic device can further include but not limited to a control unit, a display, a storage unit, a random access memory unit (RAM), a read only memory unit (ROM) or a combination thereof.

According to the above description of the present disclosure, the following 1st-11th specific embodiments are provided for further explanation.

1st Embodiment

Figure 2:
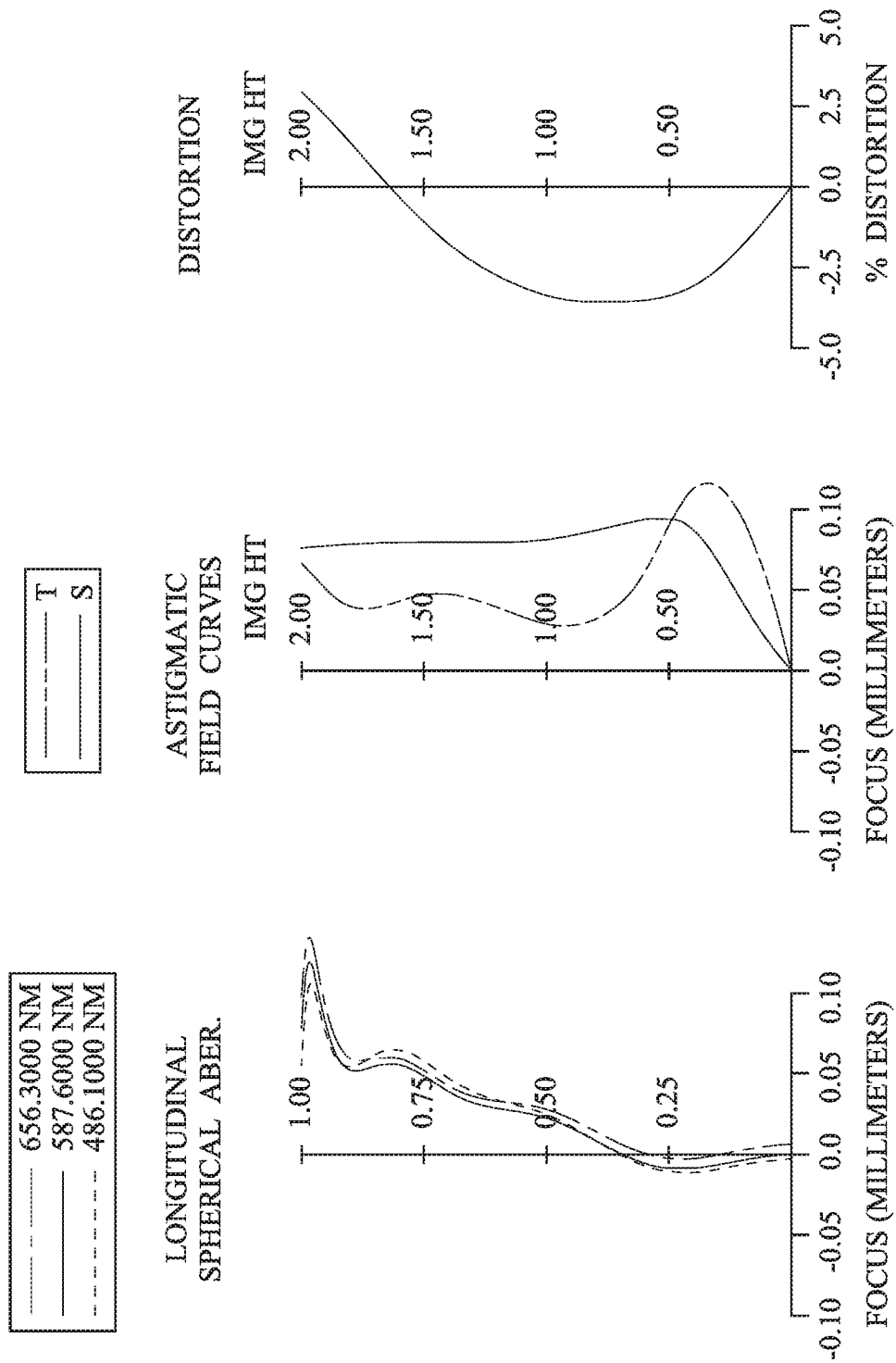
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes a photographing optical lens assembly (its reference numeral is omitted) and an image sensor 190. The photographing optical lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image surface 180, wherein the image sensor 190 is disposed on the image surface 180 of the photographing optical lens assembly. The photographing optical lens assembly has a total of six lens elements (110-160) with refractive power. There is an air space in a paraxial region between any two of the first lens element 110, the second lens element 120, the third lens element 130, the fourth lens element 140, the fifth lens element 150, and the sixth lens element 160 that are adjacent to each other, and there is no relative displacement among the lens elements (110-160) with refractive power.

The first lens element 110 with positive refractive power has an object-side surface 111 being convex in a paraxial region thereof and an image-side surface 112 being convex in a paraxial region thereof. The first lens element 110 is made of plastic material, and has the object-side surface 111 and the image-side surface 112 being both aspheric. Furthermore, the image-side surface 112 of the first lens element 110 includes at least one concave shape in an off-axial region thereof.

The second lens element 120 with negative refractive power has an object-side surface 121 being convex in a paraxial region thereof and an image-side surface 122 being concave in a paraxial region thereof. The second lens element 120 is made of plastic material, and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material, and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material, and has the object-side surface 141 and the image-side surface 142 being both aspheric.

The fifth lens element 150 with positive refractive power has an object-side surface 151 being concave in a paraxial region thereof and an image-side surface 152 being convex in a paraxial region thereof. The fifth lens element 150 is made of plastic material, and has the object-side surface 151 and the image-side surface 152 being both aspheric.

The sixth lens element 160 with negative refractive power has an object-side surface 161 being concave in a paraxial region thereof and an image-side surface 162 being convex in a paraxial region thereof. The sixth lens element 160 is made of plastic material, and has the object-side surface 161 and the image-side surface 162 being both aspheric. Furthermore, the object-side surface 161 of the sixth lens element 160 includes at least one convex shape in an off-axial region thereof.

The IR-cut filter 170 is made of glass material and located between the sixth lens element 160 and the image surface 180, and will not affect a focal length of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens assembly according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=6.60 mm; Fno=2.85; and HFOV=16.3 degrees.

In the photographing optical lens assembly according to the 1st embodiment, when an Abbe number of the fifth lens element 150 is V5, the following condition is satisfied: V5=21.4.

In the photographing optical lens assembly according to the 1st embodiment, when a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, and a maximum of N1, N2, N3, N4, N5 and N6 is Nmax, and the following condition is satisfied: Nmax=1.650.

In the photographing optical lens assembly according to the 1st embodiment, when a curvature radius of the object-side surface 141 of the fourth lens element 140 is R7, and a curvature radius of the image-side surface 142 of the fourth lens element 140 is R8, the following condition is satisfied: (R7−R8)(R7+R8)=0.03.

In the photographing optical lens assembly according to the 1st embodiment, when a curvature radius of the image-side surface 152 of the fifth lens element 150 is R10, a curvature radius of the object-side surface 161 of the sixth lens element 160 is R11, and a curvature radius of the image-side surface 162 of the sixth lens element 160 is R12, the following conditions are satisfied: (R10+R11)/(R10−R11)=1.62; and (R11+R12)/(R11−R12)=−1.38.

In the photographing optical lens assembly according to the let embodiment, when the focal length of the photographing optical lens assembly is f, a curvature radius of the object-side surface 111 of the first lens element 110 is R1, and the curvature radius of the image-side surface 162 of the sixth lens element 160 is R12, the following condition is satisfied: f/R1−f/R12=5.63.

In the photographing optical lens assembly according to the 1st embodiment, when the focal length of the photographing optical lens assembly is f, a focal length of the first lens element 110 is f1, a focal length of the second lens element 120 is f2, and a focal length of the sixth lens element 160 is f6, the following condition is satisfied: |f/f1|+|f/f2|+|f/f8|=7.30.

In the photographing optical lens assembly according to the 1st embodiment, when an axial distance between the aperture stop 100 and the image-side surface 162 of the sixth lens element 160 is SD, and an axial distance between the object-side surface 111 of the first lens element 110 and the image-side surface 162 of the sixth lens element 160 is TD, the following condition is satisfied: SD/TD=0.87.

In the photographing optical lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, a sum of axial distances between each two lens elements of the first lens element 110, the second lens element 120, the third lens element 130, the fourth lens element 140, the fifth lens element 150 and the sixth lens element 160 which are adjacent to each other is ΣAT (ΣAT=T12+T23+T34+T45+T56), and the axial distance between the object-side surface 111 of the first lens element 110 and the image-side surface 162 of the sixth lens element 160 is TD, the following condition is satisfied: ΣAT/TD=0.48.

In the photographing optical lens assembly according to the 1st embodiment, when the axial distance between the object-side surface 111 of the first lens element 110 and the image-side surface 162 of the sixth lens element 160 is TD, and an axial distance between the image-side surface 132 of the third lens element 130 and the object-side surface 151 of the fifth lens element 150 is Dr6r9, the following condition is satisfied: TD/Dr6r9=2.49.

In the photographing optical lens assembly according to the 1st embodiment, when the focal length of the photographing optical lens assembly is f, and the axial distance between the object-side surface 111 of the first lens element 110 and the image-side surface 162 of the sixth lens element 160 is TD, the following condition is satisfied: TD/f=0.71.

In the photographing optical lens assembly according to the 1st embodiment, when the focal length of the photographing optical lens assembly is f, and an axial distance between the image-side surface 162 of the sixth lens element 160 and the image surface 180 is BL, the following condition is satisfied: BL/f=0.10.

Figure 17:
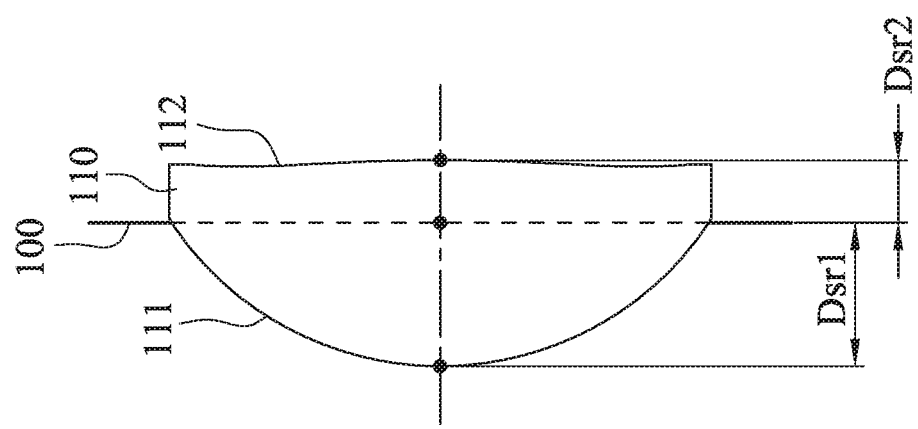
FIG. 17 shows a schematic view of the parameters Dsr1 and Dsr2 according to the 1st embodiment of FIG. 1.

FIG. 17 shows a schematic view of the parameters Dsr1 and Dsr2 according to the 1st embodiment of FIG. 1. In FIG. 17, when an axial distance between the aperture stop 100 and the object-side surface 111 of the first lens element 110 is Dsr1, and an axial distance between the aperture stop 100 and the image-side surface 112 of the first lens element 110 is Dsr2, the following condition is satisfied: |Dsr1/Dsr2|=2.29.

In the photographing optical lens assembly according to the 1st embodiment, when a distance in parallel with the optical axis from an axial vertex on the image-side surface 162 of the sixth lens element 160 to a maximum effective radius position on the image-side surface 162 of the sixth lens element 160 is SAG62, and a central thickness of the sixth lens element 160 is CT6, the following condition is satisfied: SAG62+CT6=−0.19 mm.

In the photographing optical lens assembly according to the 1st embodiment, when the focal length of the photographing optical lens assembly is f, and a maximum image height of the photographing optical lens assembly is ImgH (half of a diagonal length of an effective photosensitive area of the image sensor 190), and the following condition is satisfied: f/ImgH=3.30.

In the photographing optical lens assembly according to the 1st embodiment, when an entrance pupil diameter of the photographing optical lens assembly is EPD, and the maximum image height of the photographing optical lens assembly is ImgH, the following condition is satisfied: EPD/ImgH=1.16.

In the photographing optical lens assembly according to the let embodiment, when an axial distance between the object-side surface 111 of the first lens element 110 and the image surface 180 is TL, and the maximum image height of the photographing optical lens assembly is ImgH, the following condition is satisfied: TL/ImgH=2.67.

The detailed optical data of the 1st embodiment are shown in Table 1 and the aspheric surface data are shown in Table 2 below.

TABLE 1

| 1st Embodiment f = 6.60 mm, Fno = 2.85, HFOV = 16.3 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Ape. Stop | Plano | −0.616 | | | | |

TABLE 1-continued

1st Embodiment
f = 6.60 mm, Fno = 2.85, HFOV = 16.3 deg.

| Surface # | | Curvature Radius | | Thickness | Material | Index | Abbe # | Focal Length |
|---|---|---|---|---|---|---|---|---|
| 2 | Lens 1 | 1.401 | ASP | 0.885 | Plastic | 1.544 | 55.9 | 2.26 |
| 3 | | −7.705 | ASP | 0.074 | | | | |
| 4 | Lens 2 | 19.967 | ASP | 0.240 | Plastic | 1.640 | 23.3 | −3.57 |
| 5 | | 2.042 | ASP | 0.454 | | | | |
| 6 | Lens 3 | 55.581 | ASP | 0.240 | Plastic | 1.530 | 55.8 | −8.42 |
| 7 | | 4.126 | ASP | 1.345 | | | | |
| 8 | Lens 4 | −1.523 | ASP | 0.270 | Plastic | 1.530 | 55.8 | 24.02 |
| 9 | | −1.444 | ASP | 0.264 | | | | |
| 10 | Lens 5 | −7.396 | ASP | 0.581 | Plastic | 1.650 | 21.4 | 20.42 |
| 11 | | −4.895 | ASP | 0.131 | | | | |
| 12 | Lens 6 | −1.157 | ASP | 0.200 | Plastic | 1.535 | 55.7 | −2.61 |
| 13 | | −7.189 | ASP | 0.200 | | | | |
| 14 | IR-cut filter | Plano | | 0.210 | Glass | 1.517 | 64.2 | — |
| 15 | | Plano | | 0.254 | | | | |
| 16 | Image | Plano | | — | | | | |

Note:
Reference wavelength is 587.6 nm (d-line).

TABLE 2

Aspheric Coefficients

| | Surface # | | | | | |
|---|---|---|---|---|---|---|
| | 2 | 3 | 4 | 5 | 6 | 7 |
| k = | −1.4062E−01 | −2.4597E+01 | −9.0000E+01 | 1.4728E+00 | 9.0000E+01 | 1.6510E+01 |
| A4 = | 1.2898E−02 | −1.2643E−03 | −1.1763E−01 | −1.1112E−01 | 1.0369E−01 | 1.1413E−01 |
| A6 = | −1.1888E−02 | 1.0847E−01 | 3.2621E−01 | 4.6820E−01 | 1.3229E−01 | 1.5192E−01 |
| A8 = | 4.3094E−02 | −1.9256E−01 | −3.4642E−01 | −5.0545E−01 | 2.0065E−02 | −3.0298E−01 |
| A10 = | −5.0838E−02 | 1.9036E−01 | 3.2732E−01 | 1.0867E+00 | 2.5143E−02 | 4.6286E−01 |
| A12 = | 2.2376E−02 | −6.9492E−02 | −1.6521E−01 | −6.4991E−01 | −1.0907E−01 | −3.7086E−01 |

| | Surface # | | | | | |
|---|---|---|---|---|---|---|
| | 8 | 9 | 10 | 11 | 12 | 13 |
| k = | −2.5852E+01 | −6.7595E+01 | 1.9876E+01 | −3.0145E+00 | −5.2456E+01 | 6.2812E−01 |
| A4 = | −6.8541E−02 | 3.3200E−02 | 4.6773E−02 | 1.3718E−02 | −3.3785E−01 | −2.4058E−01 |
| A6 = | 2.1741E−02 | 8.9354E−03 | −1.0866E−01 | −1.2520E−01 | 3.4680E−01 | 2.6195E−01 |
| A8 = | 2.7936E−03 | 2.4797E−03 | 8.4133E−02 | 9.5116E−02 | −1.7013E−01 | −1.3165E−01 |
| A10 = | −8.0163E−04 | −1.1932E−03 | −2.9780E−02 | −3.5972E−02 | 4.1184E−02 | 3.6076E−02 |
| A12 = | −1.2918E−03 | −3.5593E−04 | 5.5338E−03 | 5.7571E−03 | −3.8257E−03 | −5.3941E−03 |
| A14 = | | | −2.9943E−04 | 1.8593E−05 | −4.3870E−07 | 3.3997E−04 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

Figure 18:
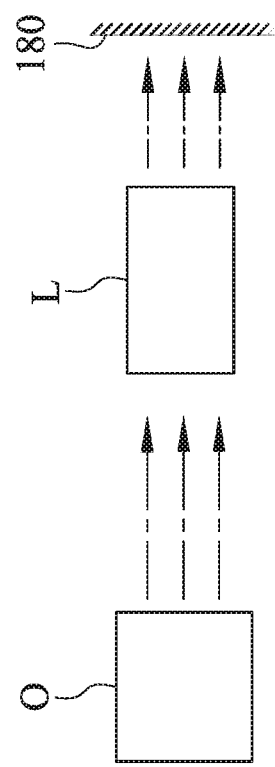
FIG. 18 shows a schematic view of one arrangement of the photographing optical lens assembly, an object and the image surface according to the 1st embodiment of FIG. 1.

FIG. 18 shows a schematic view of one arrangement of the photographing optical lens assembly L, an imaged object O and the image surface 180 according to the 1st embodiment of FIG. 1. In FIG. 18, the incident light straightly passes into the photographing optical lens assembly L from the imaged object O, and images on the image surface 180.

Figure 19:
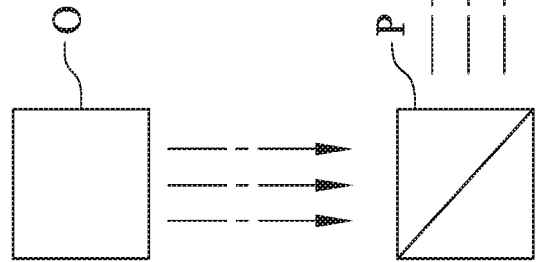
FIG. 19 shows a schematic view of another arrangement of the photographing optical lens assembly, a prism, an object and the image surface according to the 1st embodiment of FIG. 1.

FIG. 19 shows a schematic view of another arrangement of the photographing optical lens assembly L, a prism P, an imaged object O and the image surface 180 according to the 1st embodiment of FIG. 1. In FIG. 19, the image capturing device further include a prism P disposed on the optical path between the imaged object O and the photographing optical lens assembly L. The arrangement of the prism P can change the direction of the incident light, so that the demanded height of the photographing optical lens assembly L can be reduced so as to obtain a more compact size of the image capturing device or the electronic device which is applied.

The following embodiments can be applied to the arrangement of FIGS. 18 and 19, and will not describe again herein.

2nd Embodiment

Figure 3:
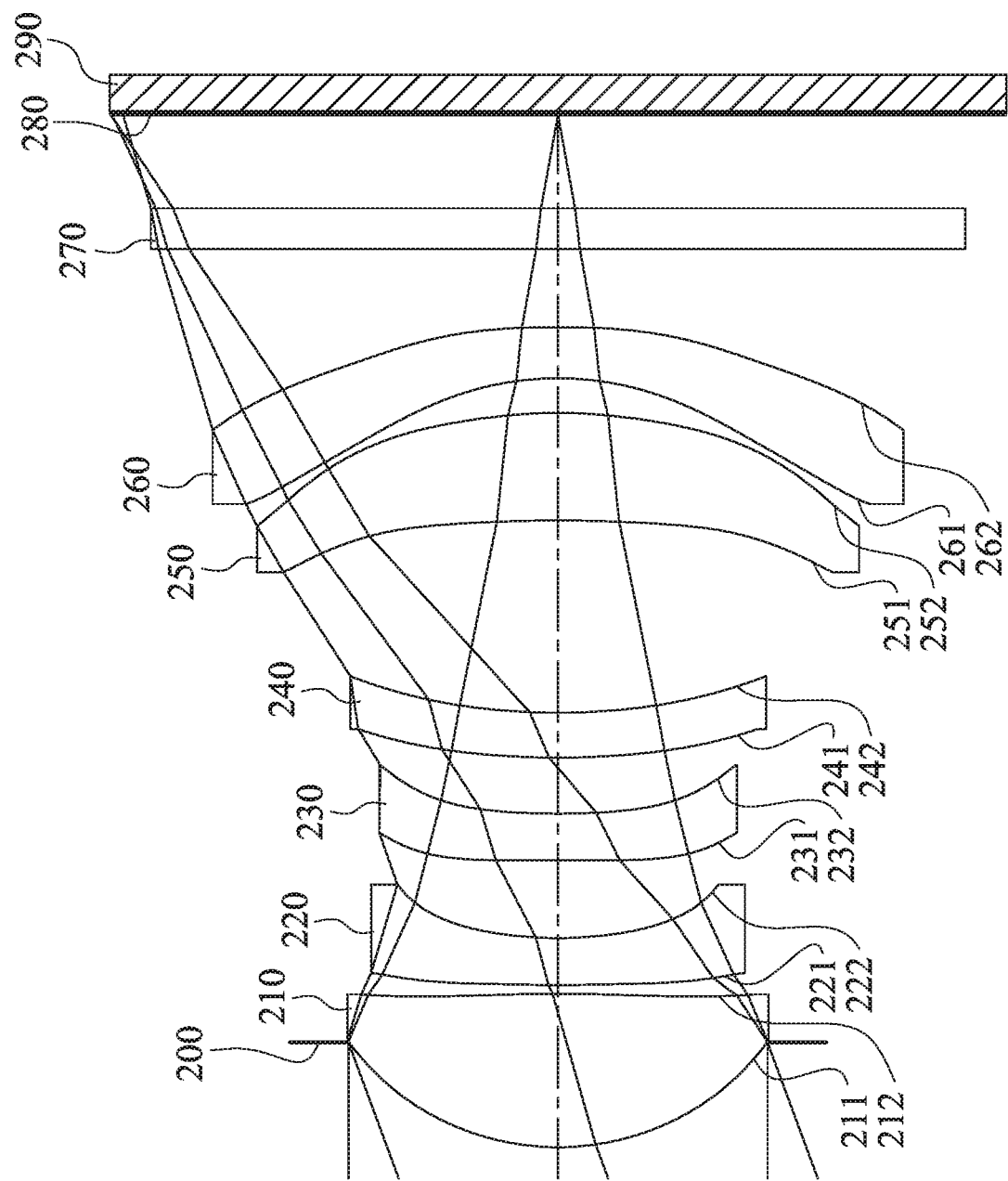
FIG. 3 is a schematic view of an image capturing device according to the 2nd embodiment of the present disclosure.
Figure 4:
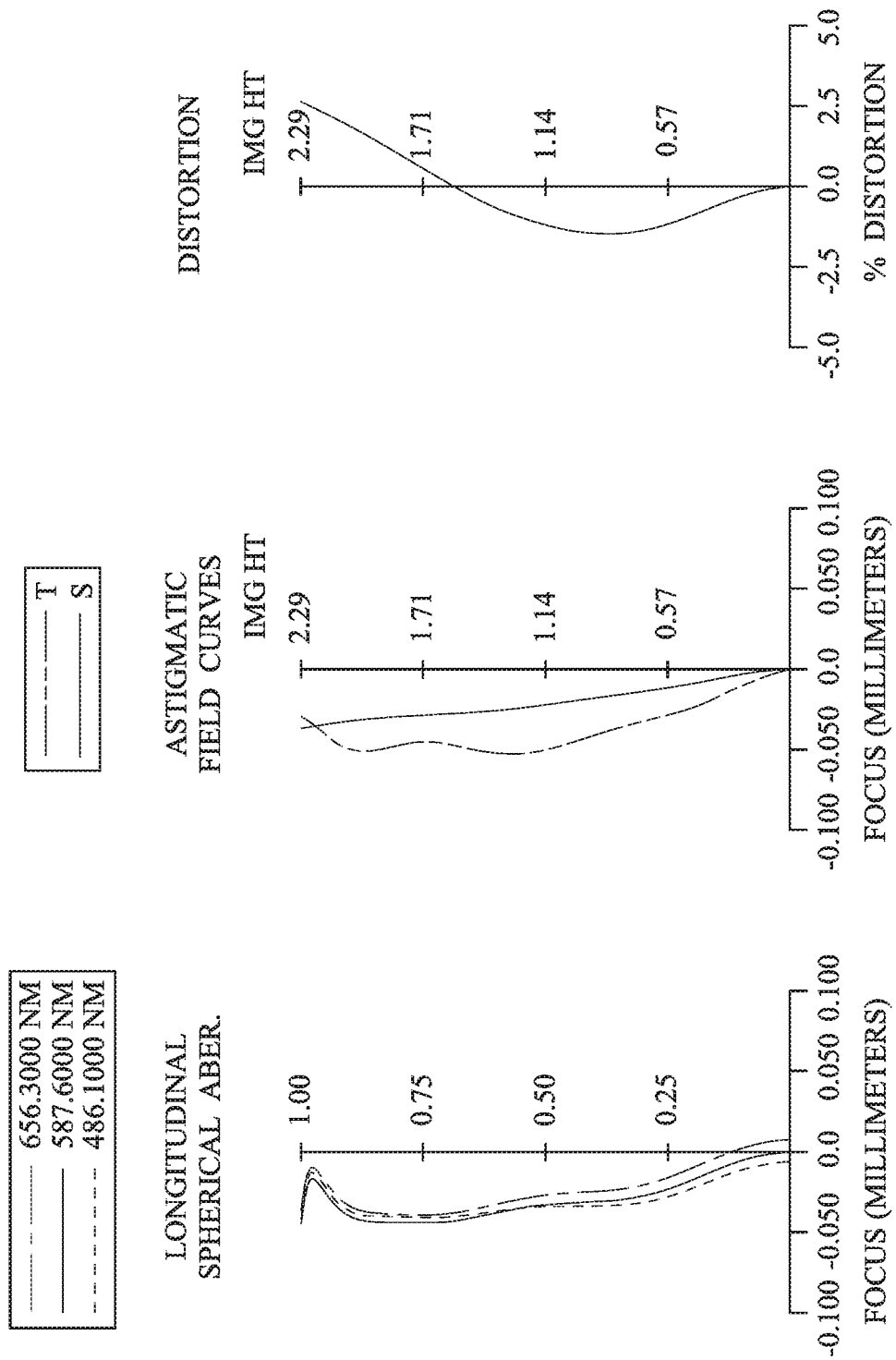
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes a photographing optical lens assembly (its reference numeral is omitted) and an image sensor 290. The photographing optical lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image surface 280, wherein the image sensor 290 is disposed on the image surface 280 of the photographing optical lens assembly. The photographing optical lens assembly has a total of six lens elements (210-260) with refractive power. There is an air space in a paraxial region between any two of the first lens element 210, the second lens element 220, the third lens element 230, the fourth lens element 240, the fifth lens element 250, and the sixth lens element 260 that are adjacent to each other, and there is no relative displacement among the lens elements (210-260) with refractive power.

The first lens element 210 with positive refractive power has an object-side surface 211 being convex in a paraxial region thereof and an image-side surface 212 being convex in a paraxial region thereof. The first lens element 210 is made of plastic material, and has the object-side surface 211 and the image-side surface 212 being both aspheric. Furthermore, the image-side surface 212 of the first lens element 210 includes at least one concave shape in an off-axial region thereof.

The second lens element 220 with negative refractive power has an object-side surface 221 being convex in a paraxial region thereof and an image-side surface 222 being concave in a paraxial region thereof. The second lens element 220 is made of plastic material, and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material, and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of plastic material, and has the object-side surface 241 and the image-side surface 242 being both aspheric.

The fifth lens element 260 with positive refractive power has an object-side surface 251 being concave in a paraxial region thereof and an image-side surface 252 being convex in a paraxial region thereof. The fifth lens element 250 is made of plastic material, and has the object-side surface 251 and the image-side surface 252 being both aspheric.

The sixth lens element 260 with negative refractive power has an object-side surface 261 being concave in a paraxial region thereof and an image-side surface 262 being convex in a paraxial region thereof. The sixth lens element 260 is made of plastic material, and has the object-side surface 261 and the image-side surface 262 being both aspheric. Furthermore, the object-side surface 261 of the sixth lens element 260 includes at least one convex shape in an off-axial region thereof.

The IR-cut filter 270 is made of glass material and located between the sixth lens element 260 and the image surface 280, and will not affect a focal length of the photographing optical lens assembly.

The detailed optical data of the 2nd embodiment are shown in Table 3 and the aspheric surface data are shown in Table 4 below.

TABLE 3

2nd Embodiment
f = 6.08 mm, Fno = 2.84, HFOV = 20.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.536 | | | | |
| 2 | Lens 1 | 1.361 | ASP | 0.784 | Plastic | 1.544 | 55.9 | 2.28 |
| 3 | | −11.386 | ASP | 0.046 | | | | |
| 4 | Lens 2 | 9.181 | ASP | 0.240 | Plastic | 1.639 | 23.5 | −3.92 |
| 5 | | 1.948 | ASP | 0.397 | | | | |
| 6 | Lens 3 | 102.146 | ASP | 0.240 | Plastic | 1.544 | 55.9 | −8.11 |
| 7 | | 4.228 | ASP | 0.287 | | | | |
| 8 | Lens 4 | 4.458 | ASP | 0.230 | Plastic | 1.639 | 23.5 | −30.59 |
| 9 | | 3.557 | ASP | 0.984 | | | | |
| 10 | Lens 5 | −7.525 | ASP | 0.551 | Plastic | 1.639 | 23.5 | 5.46 |
| 11 | | −2.453 | ASP | 0.177 | | | | |
| 12 | Lens 6 | −1.583 | ASP | 0.261 | Plastic | 1.544 | 55.9 | −3.99 |
| 13 | | −6.198 | ASP | 0.400 | | | | |
| 14 | IR-cut filter | Plano | | 0.210 | Glass | 1.517 | 64.2 | — |
| 15 | | Plano | | 0.486 | | | | |
| 16 | Image | Plano | | — | | | | |

Note:
Reference wavelength is 587.6 nm (d-line).

TABLE 4

Aspheric Coefficients

| | Surface # | | | | |
|---|---|---|---|---|---|
| | 2 | 3 | 4 | 5 | 6 | 7 |
| k = | −1.2171E−01 | −1.8953E+01 | −4.1584E+01 | 1.2058E+00 | 5.5422E−13 | 1.7369E+01 |
| A4 = | 1.5322E−02 | 8.2010E−04 | −1.2010E−01 | −1.1796E−01 | 9.2303E−02 | 1.2289E−01 |
| A6 = | −1.0098E−02 | 1.0959E−01 | 3.3875E−01 | 4.7479E−01 | 1.5357E−01 | 1.7618E−01 |
| A8 = | 4.0678E−02 | −1.7580E−01 | −3.3622E−01 | −4.5950E−01 | 3.5288E−02 | −2.9343E−01 |

TABLE 4-continued

| Aspheric Coefficients | | | | | |
|---|---|---|---|---|---|
| A10 = -4.9307E-02 | 1.9500E-01 | 3.1476E-01 | 1.0178E+00 | 2.1752E-02 | 4.6628E-01 |
| A12 = 2.6221E-02 | -8.9096E-02 | -1.8498E-01 | -6.3710E-01 | -1.2060E-01 | -3.7229E-01 |

| | Surface # | | | | |
|---|---|---|---|---|---|
| | 8 | 9 | 10 | 11 | 12 | 13 |
| k = | 8.0249E+00 | 5.0826E+00 | 2.2816E+01 | -2.0210E+01 | -1.2672E+01 | 2.4593E+00 |
| A4 = | 7.5720E-03 | 4.8864E-03 | 5.2455E-02 | 6.5782E-03 | -3.4674E-01 | -2.4388E-01 |
| A6 = | 3.9418E-03 | 2.2836E-03 | -1.2326E-01 | -1.2744E-01 | 3.4643E-01 | 2.5869E-01 |
| A8 = | -6.6134E-04 | -2.2344E-03 | 8.0491E-02 | 9.4986E-02 | -1.6999E-01 | -1.3152E-01 |
| A10 = | -3.8605E-04 | -4.6105E-03 | -2.9850E-02 | -3.5963E-02 | 4.1233E-02 | 3.6169E-02 |
| A12 = | -4.2392E-04 | | 5.8933E-03 | 5.7529E-03 | -3.8048E-03 | -5.3744E-03 |
| A14 = | | | -1.0186E-04 | 3.9104E-06 | 7.3339E-06 | 3.4372E-04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.08 | SD/TD | 0.87 |
| Fno | 2.84 | ΣAT/TD | 0.45 |
| HFOV [deg.] | 20.2 | TD/Dr6r9 | 2.80 |
| V5 | 23.5 | TD/f | 0.69 |
| Nmax | 1.639 | BL/f | 0.18 |
| (R7 − R8)/(R7 + R8) | 0.11 | |Dsr1/Dsr2| | 2.16 |
| (R10 + R11)/(R10 − R11) | 4.64 | SAG62 + CT6 [mm] | −0.27 |
| (R11 + R12)/(R11 − R12) | −1.69 | f/ImgH | 2.66 |
| f/R1 − f/R12 | 5.45 | EPD/ImgH | 0.94 |
| |f/f1| + |f/f2| + |f/f6| | 5.74 | TL/ImgH | 2.32 |

3rd Embodiment

Figure 5:
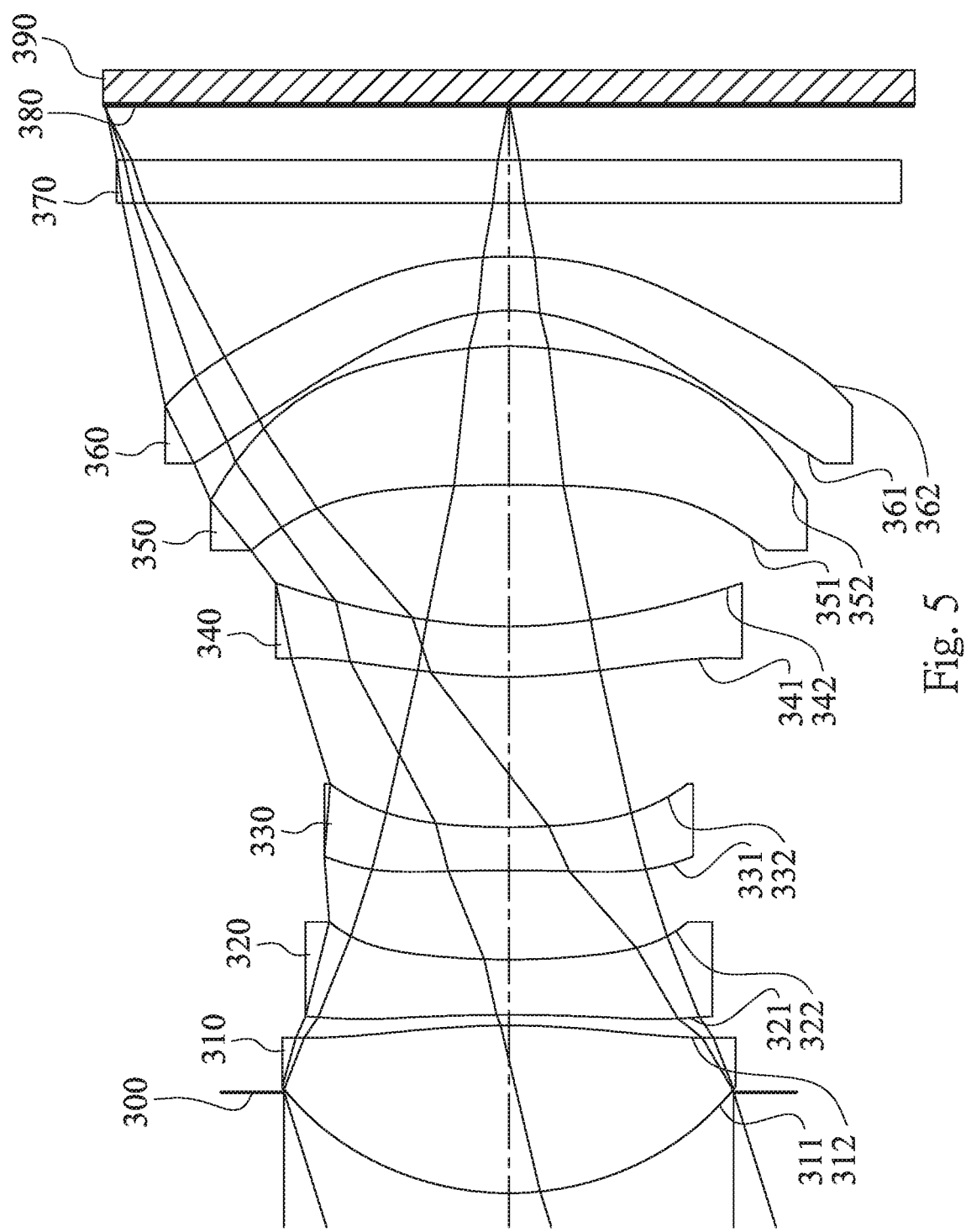
FIG. 5 is a schematic view of an image capturing device according to the 3rd embodiment of the present disclosure.
Figure 6:
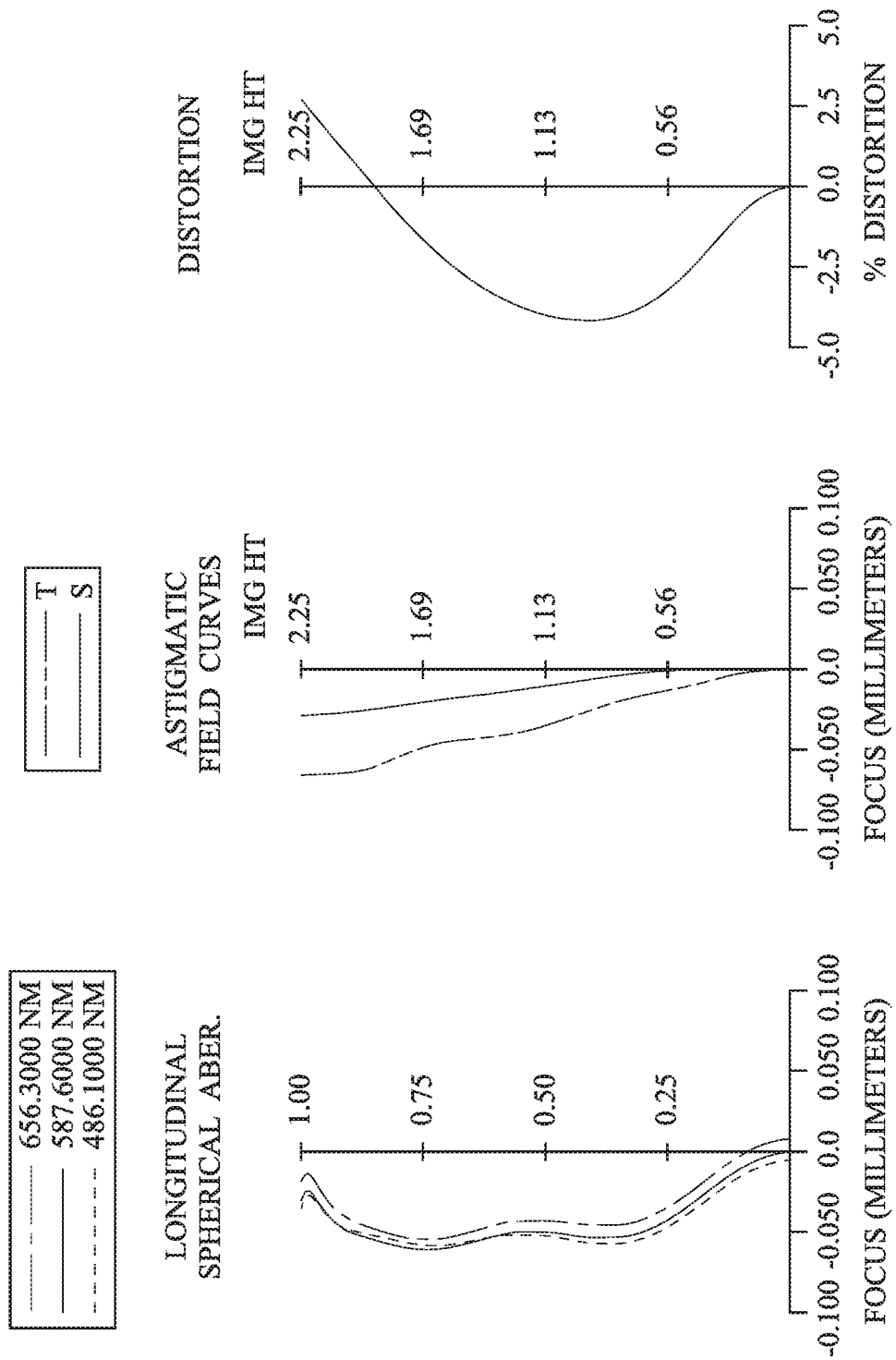
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment, in FIG. 5, the image capturing device includes a photographing optical lens assembly (its reference numeral is omitted) and an image sensor 390. The photographing optical lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image surface 380, wherein the image sensor 390 is disposed on the image surface 380 of the photographing optical lens assembly. The photographing optical lens assembly has a total of six lens elements (310-380) with refractive power. There is an air space in a paraxial region between any two of the first lens element 310, the second lens element 320, the third lens element 330, the fourth lens element 340, the fifth lens element 350, and the sixth lens element 360 that are adjacent to each other, and there is no relative displacement among the lens elements (310-360) with refractive power.

The first lens element 310 with positive refractive power has an object-side surface 311 being convex in a paraxial region thereof and an image-side surface 312 being convex in a paraxial region thereof. The first lens element 310 is made of plastic material, and has the object-side surface 311 and the image-side surface 312 being both aspheric. Furthermore, the image-side surface 312 of the first lens element 310 includes at least one concave shape in an off-axial region thereof.

The second lens element 320 with negative refractive power has an object-side surface 321 being concave in a paraxial region thereof and an image-side surface 322 being concave in a paraxial region thereof. The second lens element 320 is made of plastic material, and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material, and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of plastic material, and has the object-side surface 351 and the image-side surface 352 being both aspheric.

The sixth lens element 360 with negative refractive power has an object-side surface 361 being concave in a paraxial region thereof and an image-side surface 362 being convex in a paraxial region thereof. The sixth lens element 360 is made of plastic material, and has the object-side surface 381 and the image-side surface 362 being both aspheric. Furthermore, the object-side surface 361 of the sixth lens element 360 includes at least one convex shape in an off-axial region thereof.

The IR-cut filter 370 is made of glass material and located between the sixth lens element 360 and the image surface 380, and will not affect a focal length of the photographing optical lens assembly.

The detailed optical data of the 3rd embodiment are shown in Table 5 and the aspheric surface data are shown in Table 6 below.

TABLE 5

3rd Embodiment
f = 7.01 mm, Fno = 2.80, HFOV = 17.5 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.562 |  |  |  |  |
| 2 | Lens 1 | 1.693 | ASP | 0.934 | Plastic | 1.544 | 55.9 | 2.41 |
| 3 |  | −4.689 | ASP | 0.059 |  |  |  |  |
| 4 | Lens 2 | −13.477 | ASP | 0.308 | Plastic | 1.639 | 23.5 | −4.86 |
| 5 |  | 4.074 | ASP | 0.498 |  |  |  |  |
| 6 | Lens 3 | −8.504 | ASP | 0.240 | Plastic | 1.544 | 55.9 | −5.22 |
| 7 |  | 4.310 | ASP | 0.838 |  |  |  |  |
| 8 | Lens 4 | 3.085 | ASP | 0.280 | Plastic | 1.650 | 21.4 | −29.54 |
| 9 |  | 2.563 | ASP | 0.790 |  |  |  |  |
| 10 | Lens 5 | −9.830 | ASP | 0.772 | Plastic | 1.650 | 21.4 | 3.57 |
| 11 |  | −1.932 | ASP | 0.199 |  |  |  |  |
| 12 | Lens 6 | −1.016 | ASP | 0.300 | Plastic | 1.583 | 30.2 | −2.92 |
| 13 |  | −2.798 | ASP | 0.300 |  |  |  |  |
| 14 | IR-cut filter | Plano |  | 0.238 | Glass | 1.517 | 64.2 | — |
| 15 |  | Plano |  | 0.308 |  |  |  |  |
| 16 | Image | Plano |  | — |  |  |  |  |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| k = | −1.3782E−01 | −1.8378E+01 | −9.0000E+01 | 8.8154E−01 | −3.6895E+01 | 1.4676E+01 |
| A4 = | 1.1137E−02 | −5.5895E−04 | −7.3809E−02 | −8.1994E−02 | 7.1702E−02 | 7.1109E−02 |
| A6 = | −8.0834E−03 | 6.1599E−02 | 1.7163E−01 | 2.4860E−01 | 6.2575E−02 | 6.6739E−02 |
| A8 = | 1.9059E−02 | −7.9476E−02 | −1.4547E−01 | −2.4903E−01 | 5.1898E−03 | −1.2188E−01 |
| A10 = | −1.6088E−02 | 6.2299E−02 | 1.0308E−01 | 3.2442E−01 | 7.5371E−03 | 1.5978E−01 |
| A12 = | 5.7825E−03 | −1.8987E−02 | −3.8693E−02 | −1.6464E−01 | −2.6301E−02 | −9.7680E−02 |
| A14 = |  |  |  | 6.9474E−03 |  |  |

| Surface # | 8 | 9 | 10 | 11 | 12 | 13 |
|---|---|---|---|---|---|---|
| k = | −2.6168E+01 | −1.7283E+01 | 4.1904E+01 | −2.9068E+01 | −9.0207E+00 | −9.3538E−01 |
| A4 = | −7.5326E−03 | 7.2144E−03 | −1.1153E−02 | −3.6939E−02 | −2.3330E−01 | −1.5854E−01 |
| A6 = | −3.2116E−03 | 6.8522E−03 | −6.1060E−02 | −5.8077E−02 | 1.8240E−01 | 1.3931E−01 |
| A8 = | −3.1266E−03 | 1.3383E−03 | 3.3709E−02 | 3.7283E−02 | −7.0186E−02 | −5.4561E−02 |
| A10 = | −7.1286E−04 | −1.6455E−03 | −9.7092E−03 | −1.1937E−02 | 1.3185E−02 | 1.1524E−02 |
| A12 = |  |  | 1.5049E−03 | 1.4140E−03 | −9.4510E−04 | −1.3406E−03 |
| A14 = |  |  | 1.0040E−04 | 1.4015E−05 | 2.0956E−06 | 6.4370E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 7.01 | SD/TD | 0.89 |
| Fno | 2.80 | ΣAT/TD | 0.46 |
| HFOV [deg.] | 17.5 | TD/Dr6r9 | 2.73 |
| V5 | 21.4 | TD/f | 0.74 |
| Nmax | 1.650 | BL/f | 0.12 |
| (R7 − R8)/(R7 + R8) | 0.09 | |Dsr1/Dsr2| | 1.51 |
| (R10 + R11)/(R10 − R11) | 3.22 | SAG62 + CT6 [mm] | −0.53 |
| (R11 + R12)/(R11 − R12) | −2.14 | f/ImgH | 3.12 |
| f/R1 − f/R12 | 6.64 | EPD/ImgH | 1.11 |
| |f/f1| + |f/f2| + |f/f6| | 6.75 | TL/ImgH | 2.70 |

4th Embodiment

Figure 7:
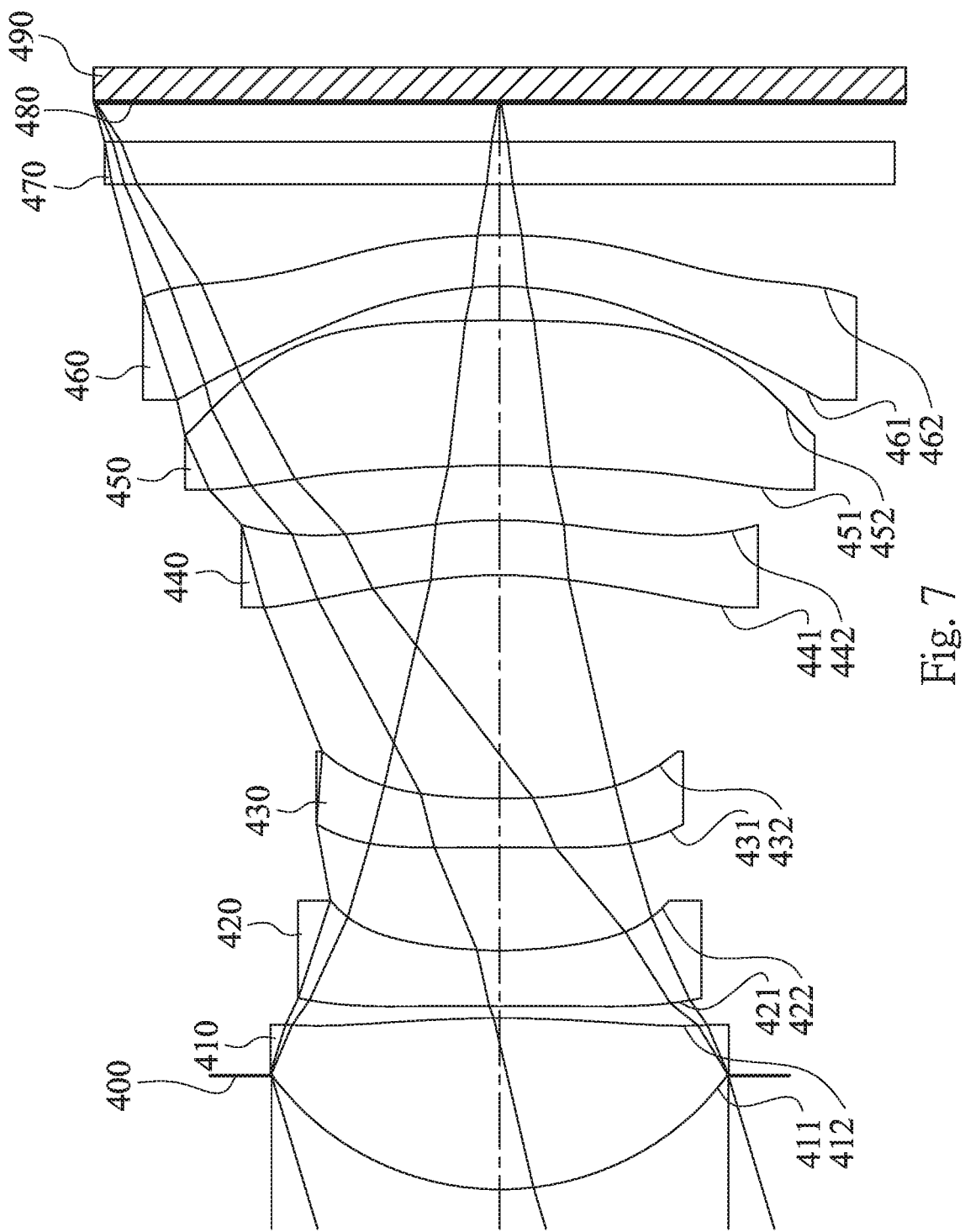
FIG. 7 is a schematic view of an image capturing device according to the 4th embodiment of the present disclosure.
Figure 8:
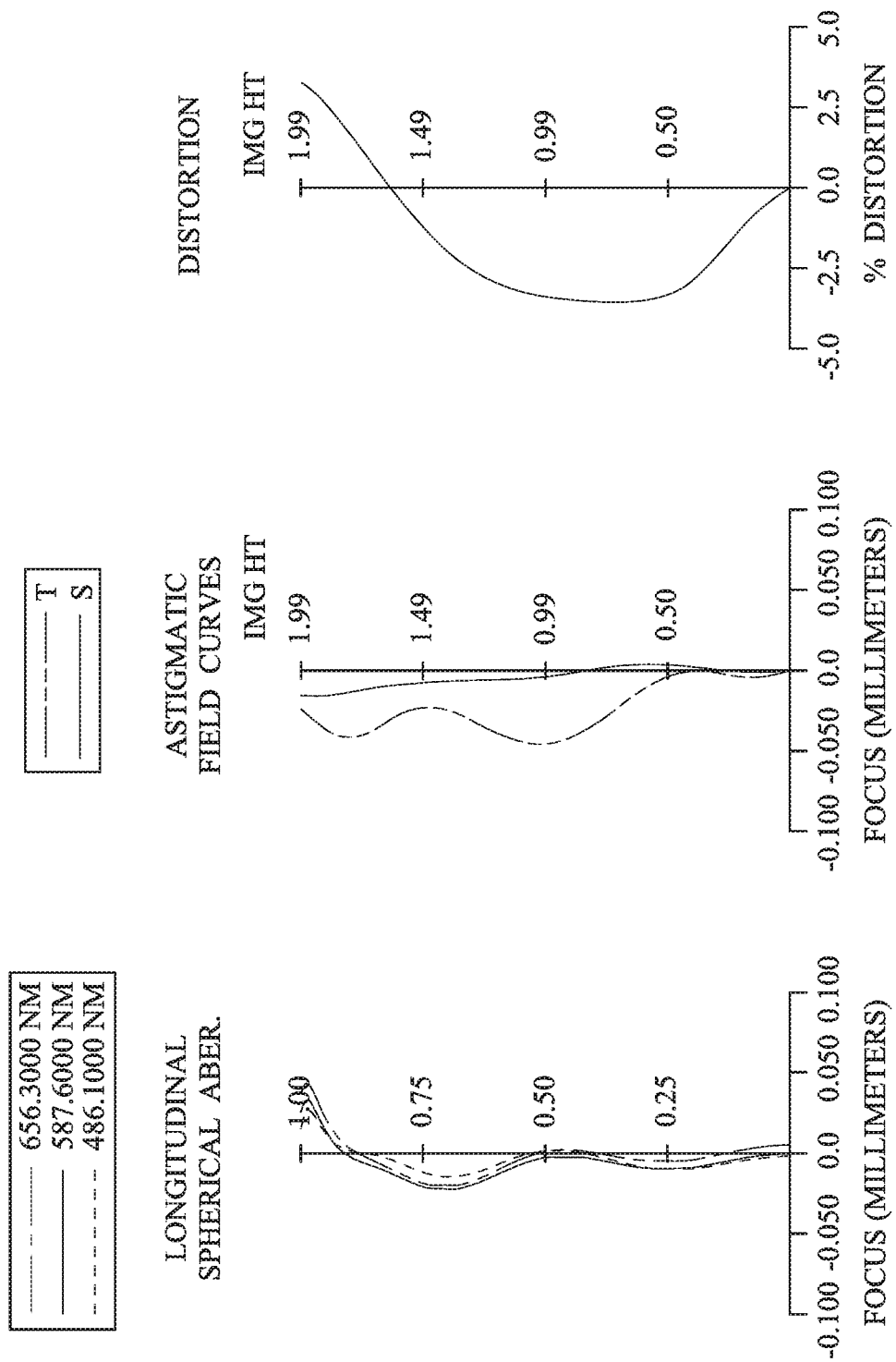
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes a photographing optical lens assembly (its reference numeral is omitted) and an image sensor 490. The photographing optical lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image surface 480, wherein the image sensor 490 is disposed on the image surface 480 of the photographing optical lens assembly. The photographing optical lens assembly has a total of six lens elements (410-460) with refractive power. There is an air space in a paraxial region between any two of the first lens element 410, the second lens element 420, the third lens element 430, the fourth lens element 440, the fifth lens element 450, and the sixth lens element 460 that are adjacent to each other, and there is no relative displacement among the lens elements (410-460) with refractive power.

The first lens element 410 with positive refractive power has an object-side surface 411 being convex in a paraxial region thereof and an image-side surface 412 being convex in a paraxial region thereof. The first lens element 410 is made of plastic material, and has the object-side surface 411 and the image-side surface 412 being both aspheric. Furthermore, the image-side surface 412 of the first lens element 410 includes at least one concave shape in an off-axial region thereof.

The second lens element 420 with negative refractive power has an object-side surface 421 being convex in a paraxial region thereof and an image-side surface 422 being concave in a paraxial region thereof. The second lens element 420 is made of plastic material, and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of plastic material, and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material, and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material, and has the object-side surface 451 and the image-side surface 452 being both aspheric.

The sixth lens element 460 with negative refractive power has an object-side surface 461 being concave in a paraxial region thereof and an image-side surface 462 being convex in a paraxial region thereof. The sixth lens element 460 is made of plastic material, and has the object-side surface 481 and the image-side surface 462 being both aspheric. Furthermore, the object-side surface 461 of the sixth lens element 460 includes at least one convex shape in an off-axial region thereof.

The IR-cut filter 470 is made of glass material and located between the sixth lens element 460 and the image surface 480, and will not affect a focal length of the photographing optical lens assembly.

The detailed optical data of the 4th embodiment are shown in Table 7 and the aspheric surface data are shown in Table 8 below.

TABLE 7

4th Embodiment
f = 6.38 mm, Fno = 2.85, HFOV = 16.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.559 | | | | |
| 2 | Lens 1 | 1.414 | ASP | 0.841 | Plastic | 1.544 | 55.9 | 2.20 |
| 3 | | −6.097 | ASP | 0.058 | | | | |
| 4 | Lens 2 | 38.283 | ASP | 0.274 | Plastic | 1.640 | 23.3 | −3.80 |
| 5 | | 2.278 | ASP | 0.506 | | | | |
| 6 | Lens 3 | −24.411 | ASP | 0.240 | Plastic | 1.530 | 55.8 | −6.20 |
| 7 | | 3.810 | ASP | 1.097 | | | | |
| 8 | Lens 4 | −2.060 | ASP | 0.270 | Plastic | 1.614 | 25.6 | 24.68 |
| 9 | | −1.904 | ASP | 0.268 | | | | |
| 10 | Lens 5 | −7.118 | ASP | 0.712 | Plastic | 1.634 | 23.8 | −45.02 |
| 11 | | −9.851 | ASP | 0.168 | | | | |
| 12 | Lens 6 | −1.519 | ASP | 0.250 | Plastic | 1.535 | 55.7 | −4.92 |
| 13 | | −3.802 | ASP | 0.250 | | | | |
| 14 | IR-cut filter | Plano | | 0.210 | Glass | 1.517 | 64.2 | — |
| 15 | | Plano | | 0.194 | | | | |
| 16 | Image | Plano | | — | | | | |

Note:
Reference wavelength is 587.6 nm (d-line).

TABLE 8

Aspheric Coefficients

| Surface # | 2 | 3 | 4 | 5 | 6 | 7 |
|---|---|---|---|---|---|---|
| k = | −1.3133E−01 | −2.5133E+01 | −9.0000E+01 | 1.3083E+00 | 1.3003E+01 | 1.4709E+01 |
| A4 = | 1.3169E−02 | −1.0013E−03 | −1.1890E−01 | −1.0944E−01 | 1.0662E−01 | 1.2441E−01 |
| A6 = | −9.3443E−03 | 1.0976E−01 | 3.2327E−01 | 4.4820E−01 | 1.3532E−01 | 1.4936E−01 |
| A8 = | 4.2152E−02 | −1.8963E−01 | −3.5207E−01 | −5.2139E−01 | 2.0243E−02 | −2.8007E−01 |
| A10 = | −5.1706E−02 | 1.8647E−01 | 3.3698E−01 | 1.0735E+00 | 2.3310E−02 | 4.8632E−01 |
| A12 = | 2.3322E−02 | −6.8709E−02 | −1.6222E−01 | −5.9598E−01 | −9.6274E−02 | −3.9461E−01 |

| Surface # | 8 | 9 | 10 | 11 | 12 | 13 |
|---|---|---|---|---|---|---|
| k = | −3.4192E+01 | −3.8337E+01 | 1.9029E+01 | 2.5433E+01 | −3.4196E+01 | −4.6231E+00 |
| A4 = | −3.7788E−02 | 3.4273E−02 | 6.4857E−02 | −1.2481E−02 | −3.3460E−01 | −2.0434E−01 |
| A6 = | 2.0221E−02 | 1.2377E−02 | −1.1021E−01 | −1.2544E−01 | 3.4229E−01 | 2.6160E−01 |
| A8 = | 2.8095E−04 | 3.5032E−03 | 8.3555E−02 | 9.5064E−02 | −1.7073E−01 | −1.3282E−01 |
| A10 = | −1.5557E−04 | −1.2182E−03 | −2.9892E−02 | −3.6001E−02 | 4.1094E−02 | 3.5989E−02 |
| A12 = | 1.2232E−03 | −6.1840E−04 | 5.5305E−03 | 5.7438E−03 | −3.8226E−03 | −5.3851E−03 |
| A14 = | | | −2.9012E−04 | 9.0034E−06 | 1.2674E−05 | 3.4624E−04 |

In the 4th embodiment, the equation of the aspheric surface profiles of the aforementioned lens elements is the same as the equation of the 1st embodiment. Also, the definitions of these parameters shown in the following table are the same as those stated in the let embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.38 | SD/TD | 0.88 |
| Fno | 2.85 | ΣAT/TD | 0.45 |
| HFOV [deg.] | 16.8 | TD/Dr6r9 | 2.86 |
| V5 | 23.8 | TD/f | 0.73 |
| Nmax | 1.640 | BL/f | 0.10 |
| (R7 − R8)/(R7 + R8) | 0.04 | |Dsr1/Dsr2| | 1.98 |
| (R10 + R11)/(R10 − R11) | 1.36 | SAG62 + CT6 [mm] | −0.05 |
| (R11 + R12)/(R11 − R12) | −2.33 | f/ImgH | 3.22 |
| f/R1 − f/R12 | 6.19 | EPD/ImgH | 1.13 |
| |f/f1| + |f/f2| + |f/f6| | 5.89 | TL/ImgH | 2.69 |

5th Embodiment

Figure 9:
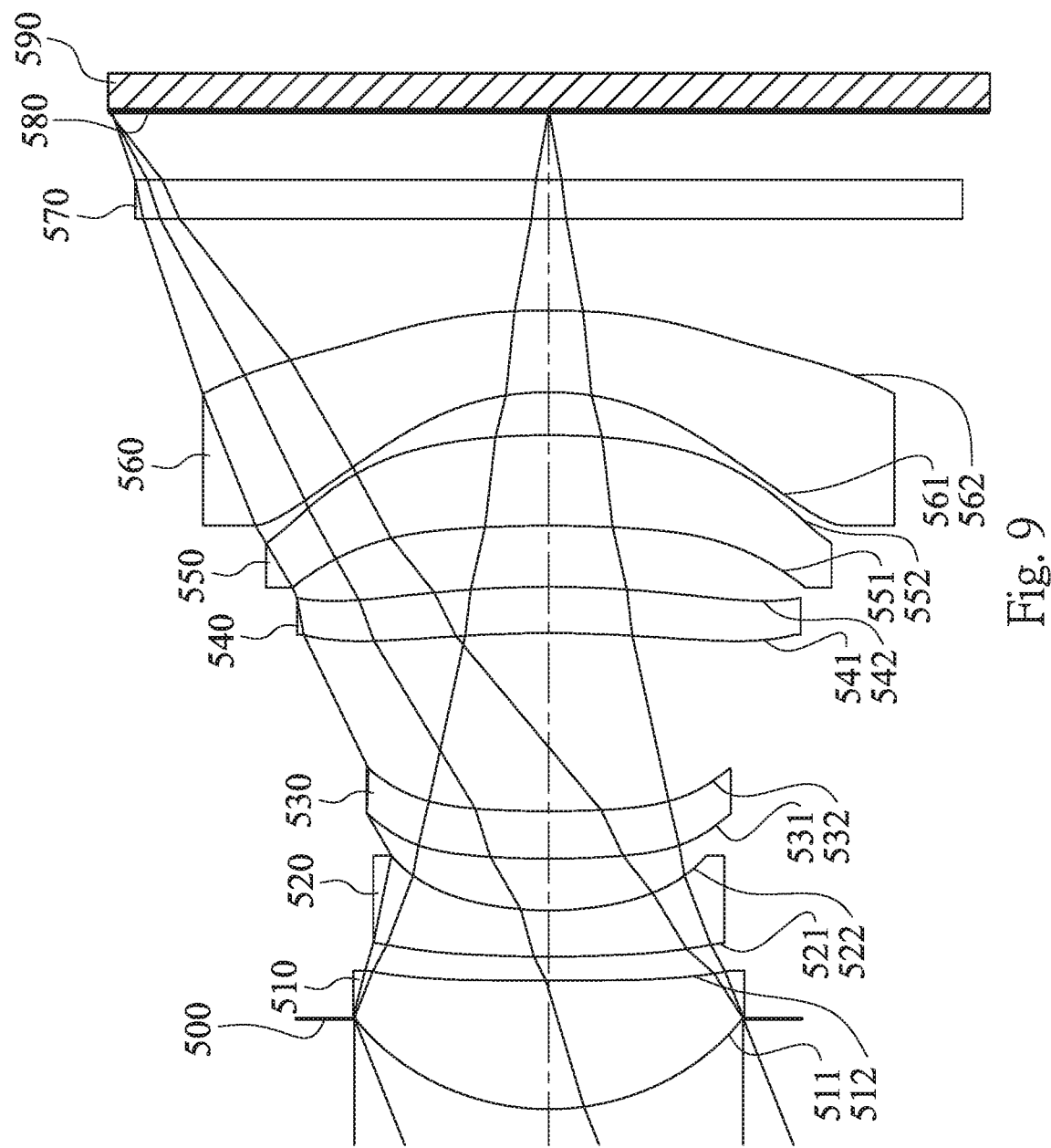
FIG. 9 is a schematic view of an image capturing device according to the 5th embodiment of the present disclosure.
Figure 10:
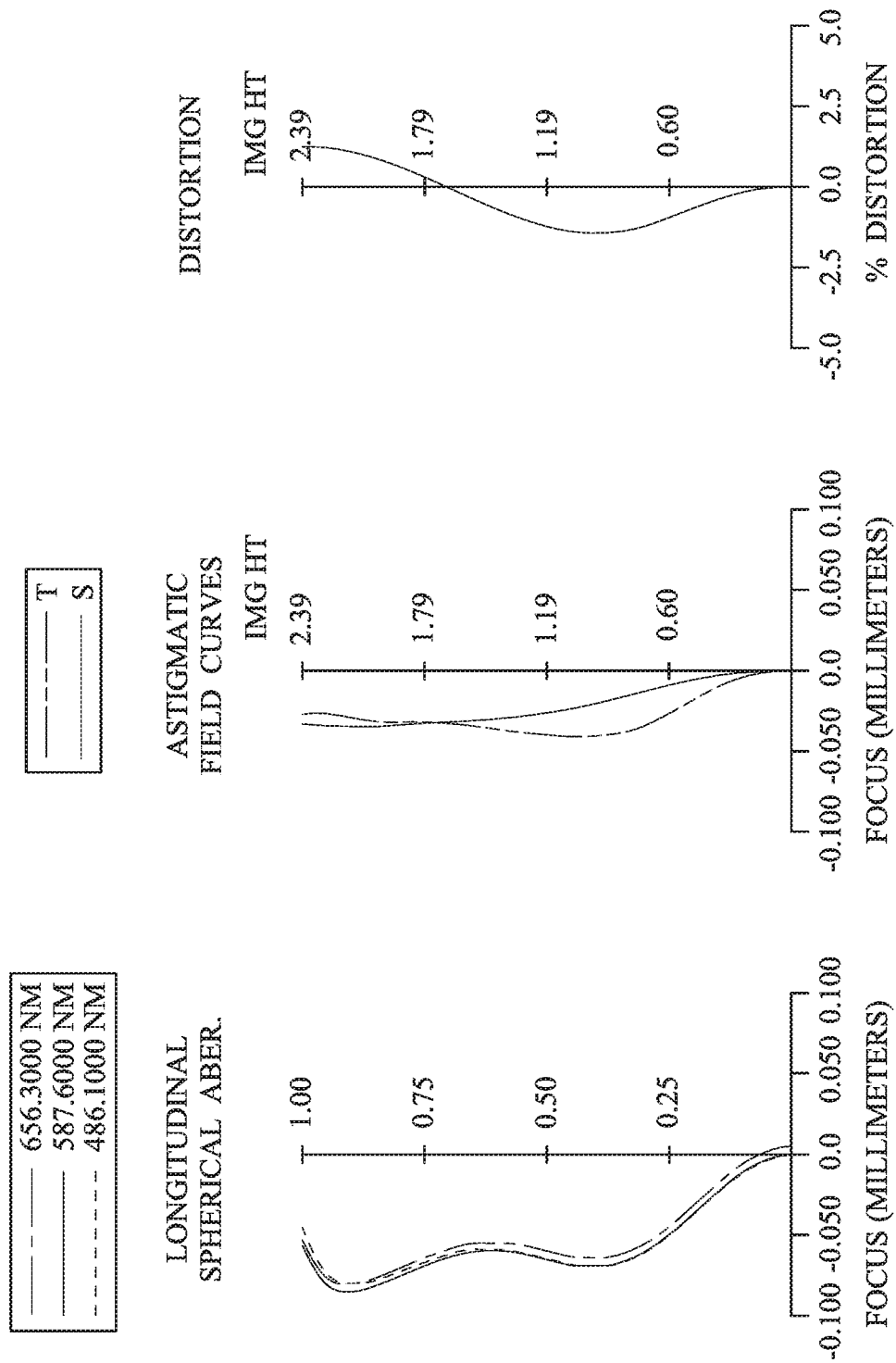
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes a photographing optical lens assembly (its reference numeral is omitted) and an image sensor 590. The photographing optical lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image surface 580, wherein the image sensor 590 is disposed on the image surface 5680 of the photographing optical lens assembly. The photographing optical lens assembly has a total of six lens elements (510-560) with refractive power. There is an air space in a paraxial region between any two of the first lens element 510, the second lens element 520, the third lens element 530, the fourth lens element 540, the fifth lens element 550, and the sixth lens element 660 that are adjacent to each other, and there is no relative displacement among the lens elements (510-560) with refractive power.

The first lens element 510 with positive refractive power has an object-side surface 511 being convex in a paraxial region thereof and an image-side surface 512 being concave in a paraxial region thereof. The first lens element 510 is made of plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material, and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material, and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material, and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of plastic material, and has the object-side surface 551 and the image-side surface 552 being both aspheric.

The sixth lens element 560 with negative refractive power has an object-side surface 561 being concave in a paraxial region thereof and an image-side surface 562 being convex in a paraxial region thereof. The sixth lens element 560 is made of plastic material, and has the object-side surface 561 and the image-side surface 562 being both aspheric. Furthermore, the object-side surface 561 of the sixth lens element 560 includes at least one convex shape in an off-axial region thereof.

The IR-cut filter 570 is made of glass material and located between the sixth lens element 560 and the image surface 580, and will not affect a focal length of the photographing optical lens assembly.

The detailed optical data of the 5th embodiment are shown in Table 9 and the aspheric surface data are shown in Table 10 below.

Moreover, these parameters can be calculated from Table 9 and Table 10 as the following values and satisfy the following conditions:

| 5th Embodiment | | | |
|---|---|---|---|
| f [mm] | 6.00 | SD/TD | 0.89 |
| Fno | 2.84 | ΣAT/TD | 0.45 |
| HFOV [deg.] | 21.7 | TD/Dr6r9 | 2.80 |
| V5 | 23.5 | TD/f | 0.72 |

TABLE 9

5th Embodiment
f = 6.00 mm, Fno = 2.84, HFOV = 21.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.492 | | | | |
| 2 | Lens 1 | 1.404 | ASP | 0.699 | Plastic | 1.544 | 55.9 | 2.69 |
| 3 | | 27.876 | ASP | 0.130 | | | | |
| 4 | Lens 2 | 6.345 | ASP | 0.251 | Plastic | 1.639 | 23.5 | −3.68 |
| 5 | | 1.690 | ASP | 0.283 | | | | |
| 6 | Lens 3 | 5.684 | ASP | 0.258 | Plastic | 1.544 | 55.9 | 43.18 |
| 7 | | 7.378 | ASP | 0.969 | | | | |
| 8 | Lens 4 | −6.582 | ASP | 0.252 | Plastic | 1.530 | 55.8 | 66.87 |
| 9 | | −5.625 | ASP | 0.332 | | | | |
| 10 | Lens 5 | −7.435 | ASP | 0.493 | Plastic | 1.639 | 23.5 | 11.28 |
| 11 | | −3.755 | ASP | 0.233 | | | | |
| 12 | Lens 6 | −1.643 | ASP | 0.444 | Plastic | 1.535 | 55.7 | −4.61 |
| 13 | | −5.378 | ASP | 0.500 | | | | |
| 14 | IR-cut filter | Plano | | 0.210 | Glass | 1.517 | 64.2 | — |
| 15 | | Plano | | 0.375 | | | | |
| 16 | Image | Plano | | — | | | | |

Note:
Reference wavelength is 587.6 nm (d-line).

TABLE 10

Aspheric Coefficients

| | | | Surface # | | | |
|---|---|---|---|---|---|---|
| | 2 | 3 | 4 | 5 | 6 | 7 |
| k = | −1.5024E−01 | −1.6404E+01 | 1.4492E+01 | 5.6982E−01 | −5.8935E+01 | −1.1845E+01 |
| A4 = | 1.4630E−02 | −1.3050E−03 | −1.1482E−01 | −1.4235E−01 | 6.6970E−02 | 9.3915E−02 |
| A6 = | −1.5720E−02 | 1.1545E−01 | 3.1060E−01 | 4.6064E−01 | 1.0747E−01 | 1.8300E−01 |
| A8 = | 4.7826E−02 | −1.8745E−01 | −3.5867E−01 | −5.3633E−01 | 5.7740E−02 | −3.0964E−01 |
| A10 = | −4.4836E−02 | 1.9734E−01 | 3.2504E−01 | 9.4413E−01 | 7.7884E−02 | 4.7705E−01 |
| A12 = | 2.2079E−02 | −8.5462E−02 | −1.7621E−01 | −6.1113E−01 | −1.2053E−01 | −2.6276E−01 |
| A14 = | | | | −2.0381E−07 | −4.2640E−04 | −6.9105E−04 |

| | | | Surface # | | | |
|---|---|---|---|---|---|---|
| | 8 | 9 | 10 | 11 | 12 | 13 |
| k = | −2.2576E+01 | 7.9104E+00 | 2.5900E+01 | −4.8261E+00 | −5.9433E+00 | −5.0579E+01 |
| A4 = | 1.6295E−02 | 1.8688E−02 | 2.7951E−02 | 1.1156E−03 | −3.4855E−01 | −2.4558E−01 |
| A6 = | 8.8372E−03 | 4.3719E−03 | −1.1655E−01 | −1.2706E−01 | 3.4511E−01 | 2.5839E−01 |
| A8 = | −1.1810E−03 | 3.4961E−03 | 8.0476E−02 | 9.5862E−02 | −1.7005E−01 | −1.3106E−01 |
| A10 = | 8.1622E−04 | −2.6288E−05 | −3.0142E−02 | −3.5747E−02 | 4.1380E−02 | 3.6249E−02 |
| A12 = | | | 5.8673E−03 | 5.7699E−03 | −3.7298E−03 | −5.3750E−03 |
| A14 = | | | −3.7050E−05 | −5.6938E−06 | 4.5157E−05 | 3.3703E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

-continued

| 5th Embodiment | | | |
|---|---|---|---|
| Nmax | 1.639 | BL/f | 0.18 |
| (R7 − R8)/(R7 + R8) | 0.08 | |Dsr1/Dsr2| | 2.38 |
| (R10 + R11)/(R10 − R11) | 2.56 | SAG62 + CT6 [mm] | −0.01 |

-continued

| 5th Embodiment | | | |
|---|---|---|---|
| (R11 + R12)/(R11 − R12) | −1.88 | f/ImgH | 2.51 |
| f/R1 − f/R12 | 5.39 | EPD/ImgH | 0.89 |
| \|f/f1\| + \|f/f2\| + \|f/f6\| | 5.16 | TL/ImgH | 2.28 |

6th Embodiment

Figure 11:
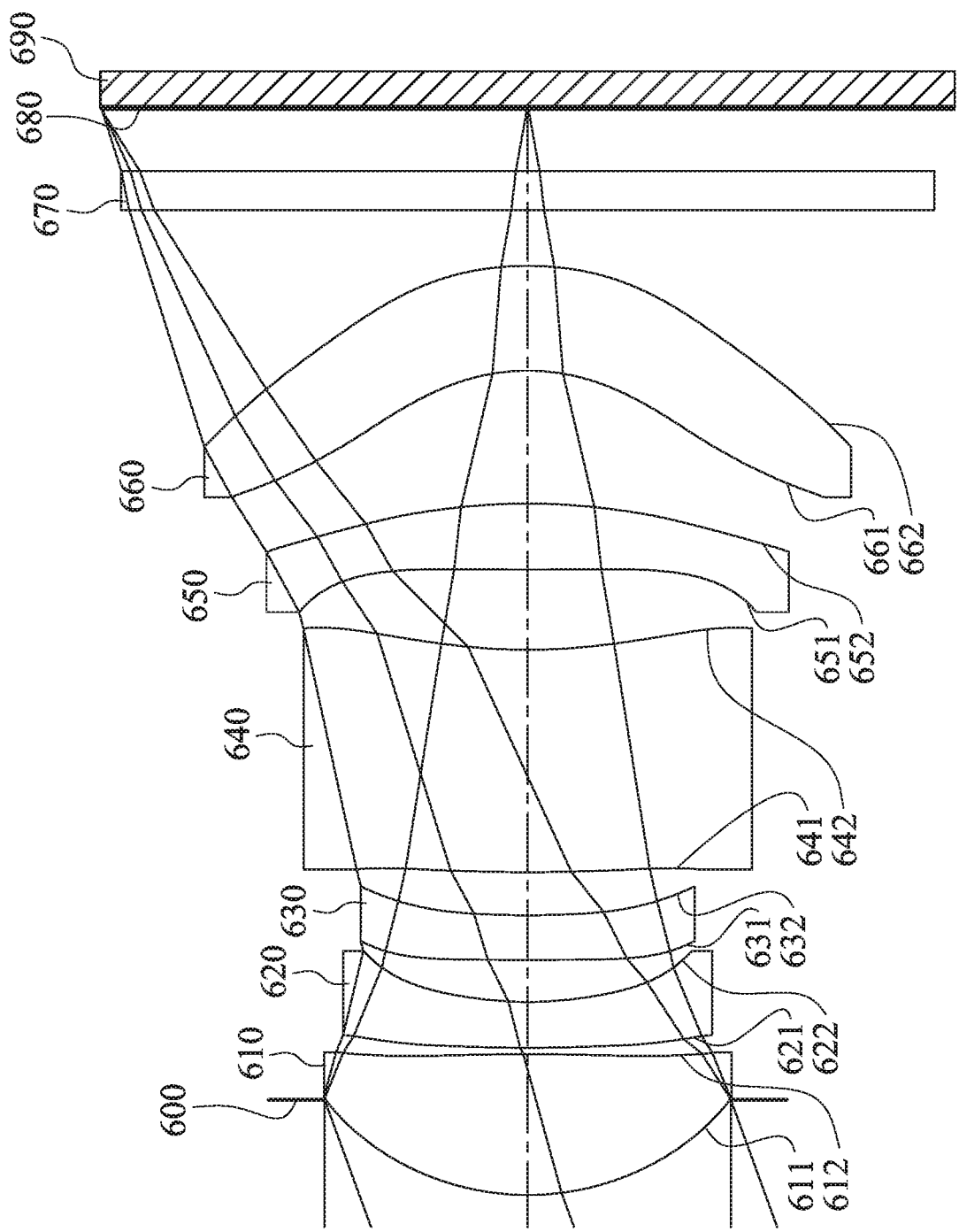
FIG. 11 is a schematic view of an image capturing device according to the 6th embodiment of the present disclosure.
Figure 12:
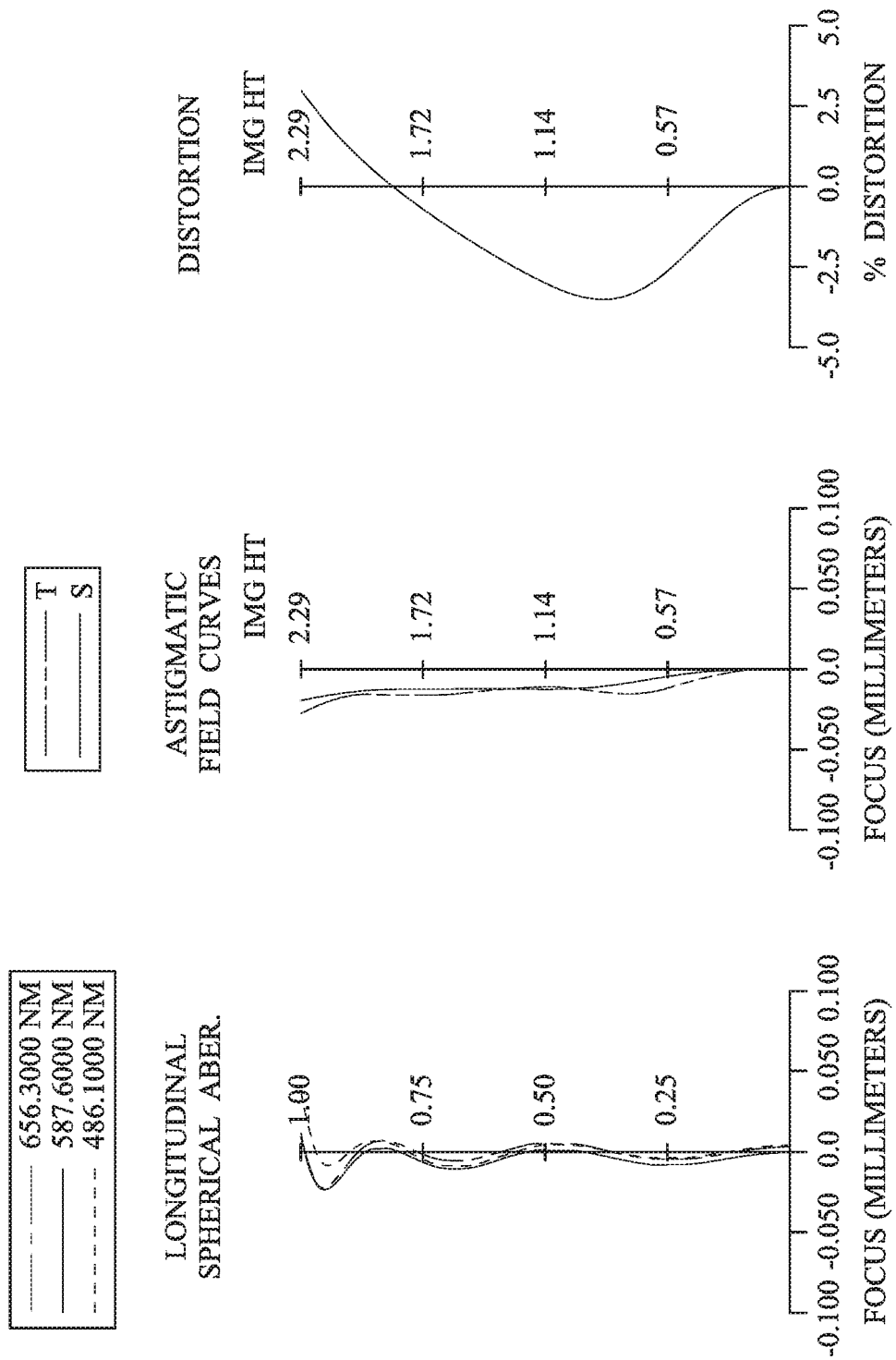
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes a photographing optical lens assembly (its reference numeral is omitted) and an image sensor 690. The photographing optical lens assembly includes, in order from an object side to an image side, an aperture stop 600, a first lens element 610, a second lens element 820, a third lens element 630, a fourth lens element 640, a fifth lens element 650, a sixth lens element 660, an IR-cut filter 670 and an image surface 680, wherein the image sensor 690 is disposed on the image surface 680 of the photographing optical lens assembly. The photographing optical lens assembly has a total of six lens elements (610-660) with refractive power. There is an air space in a paraxial region between any two of the first lens element 610, the second lens element 620, the third lens element 630, the fourth lens element 640, the fifth lens element 650, and the sixth lens element 660 that are adjacent to each other, and there is no relative displacement among the lens elements (610-660) with refractive power.

The first lens element 610 with positive refractive power has an object-side surface 611 being convex in a paraxial region thereof and an image-side surface 612 being convex in a paraxial region thereof. The first lens element 610 is made of plastic material, and has the object-side surface 611 and the image-side surface 612 being both aspheric. Furthermore, the image-side surface 612 of the first lens element 610 includes at in an off-axial region thereof.

The second lens element 620 with negative refractive power has an object-side surface 621 being convex in a paraxial region thereof and an image-side surface 622 being concave in a paraxial region thereof. The second lens element 620 is made of plastic material, and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material, and has the object-side surface 641 and the image-side surface 642 being both aspheric.

The fifth lens element 650 with positive refractive power has an object-side surface 651 being convex in a paraxial region thereof and an image-side surface 652 being convex in a paraxial region thereof. The fifth lens element 650 is made of plastic material, and has the object-side surface 651 and the image-side surface 652 being both aspheric.

The sixth lens element 660 with negative refractive power has an object-side surface 681 being concave in a paraxial region thereof and an image-side surface 662 being convex in a paraxial region thereof. The sixth lens element 660 is made of plastic material, and has the object-side surface 661 and the image-side surface 662 being both aspheric. Furthermore, the object-side surface 661 of the sixth lens element 660 includes at least one convex shape in an off-axial region thereof.

The IR-cut filter 670 is made of glass material and located between the sixth lens element 660 and the image surface 680, and will not affect a focal length of the photographing optical lens assembly.

The detailed optical data of the 8th embodiment are shown in Table 11 and the aspheric surface data are shown in Table 12 below.

TABLE 11

6th Embodiment
f = 6.10 mm, Fno = 2.80, HFOV = 20.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.511 | | | | |
| 2 | Lens 1 | 1.443 | ASP | 0.755 | Plastic | 1.544 | 55.9 | 2.43 |
| 3 | | −12.990 | ASP | 0.035 | | | | |
| 4 | Lens 2 | 8.114 | ASP | 0.246 | Plastic | 1.639 | 23.5 | −4.21 |
| 5 | | 1.995 | ASP | 0.225 | | | | |
| 6 | Lens 3 | 65.131 | ASP | 0.240 | Plastic | 1.530 | 55.8 | −12.52 |
| 7 | | 6.015 | ASP | 0.231 | | | | |
| 8 | Lens 4 | 9.462 | ASP | 1.193 | Plastic | 1.530 | 55.8 | −9.09 |
| 9 | | 3.053 | ASP | 0.431 | | | | |
| 10 | Lens 5 | 34.515 | ASP | 0.354 | Plastic | 1.544 | 55.9 | 5.60 |
| 11 | | −3.328 | ASP | 0.713 | | | | |
| 12 | Lens 6 | −1.153 | ASP | 0.562 | Plastic | 1.583 | 30.2 | −8.76 |
| 13 | | −1.757 | ASP | 0.300 | | | | |
| 14 | IR-cut filter | Plano | | 0.210 | Glass | 1.517 | 64.2 | — |
| 15 | | Plano | | 0.338 | | | | |
| 16 | Image | Plano | | — | | | | |

Note:
Reference wavelength is 587.6 nm (d-line).

TABLE 12

Aspheric Coefficients

| Surface # | 2 | 3 | 4 | 5 | 6 | 7 |
|---|---|---|---|---|---|---|
| k = | −1.6893E−01 | −8.4771E+01 | 3.3006E+01 | 3.1298E−01 | −9.0000E+01 | 3.8719E+01 |
| A4 = | 1.1604E−02 | 7.2658E−03 | −1.1384E−01 | −1.3817E−01 | 5.5111E−02 | 1.1133E−01 |
| A6 = | −5.4101E−03 | 1.2022E−01 | 3.1013E−01 | 4.0136E−01 | 1.1259E−01 | 1.3082E−01 |
| A8 = | 3.7435E−02 | −2.0016E−01 | −3.6324E−01 | −4.9512E−01 | −4.2268E−02 | −3.6660E−01 |
| A10 = | −4.4881E−02 | 1.9638E−01 | 3.2472E−01 | 1.0291E+00 | 1.4140E−01 | 3.8664E−01 |
| A12 = | 2.3439E−02 | −8.0749E−02 | −1.6310E−01 | −6.9173E−01 | 3.7814E−02 | −2.2648E−01 |
| A14 = | | | | 7.8203E−09 | −1.7753E−01 | −1.4794E−08 |

| Surface # | 8 | 9 | 10 | 11 | 12 | 13 |
|---|---|---|---|---|---|---|
| k = | −5.1077E+01 | −8.6335E+00 | −1.0000E+00 | −1.3153E+00 | −2.6671E+00 | −4.6271E+00 |
| A4 = | −1.2920E−02 | −1.2607E−02 | −1.4802E−02 | 4.1599E−02 | −2.7281E−01 | −3.0965E−01 |
| A6 = | 1.4081E−02 | −1.0240E−02 | −1.1592E−01 | −1.0045E−01 | 3.4374E−01 | 2.8242E−01 |
| A8 = | −3.6309E−02 | 7.2976E−04 | 7.9716E−02 | 9.6152E−02 | −1.7026E−01 | −1.3277E−01 |
| A10 = | −1.6925E−02 | −3.4278E−03 | −3.2911E−02 | −3.6752E−02 | 4.1086E−02 | 3.5383E−02 |
| A12 = | | | 3.6746E−03 | 5.2620E−03 | −3.9531E−03 | −5.4164E−03 |
| A14 = | | | −1.1429E−03 | −2.4013E−04 | −3.8430E−05 | 3.8560E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.10 | SD/TD | 0.90 |
| Fno | 2.80 | ΣAT/TD | 0.33 |
| HFOV [deg.] | 20.0 | TD/Dr6r9 | 2.69 |
| V5 | 55.9 | TD/f | 0.82 |
| Nmax | 1.639 | BL/f | 0.14 |
| (R7 − R8)/(R7 + R8) | 0.51 | \|Dsr1/Dsr2\| | 2.09 |
| (R10 + R11)/(R10 − R11) | 2.06 | SAG62 + CT6 [mm] | −0.41 |
| (R11 + R12)/(R11 − R12) | −4.82 | f/ImgH | 2.67 |
| f/R1 − f/R12 | 7.70 | EPD/ImgH | 0.95 |
| \|f/f1\| + \|f/f2\| + \|f/f6\| | 4.65 | TL/ImgH | 2.55 |

7th Embodiment

Figure 13:
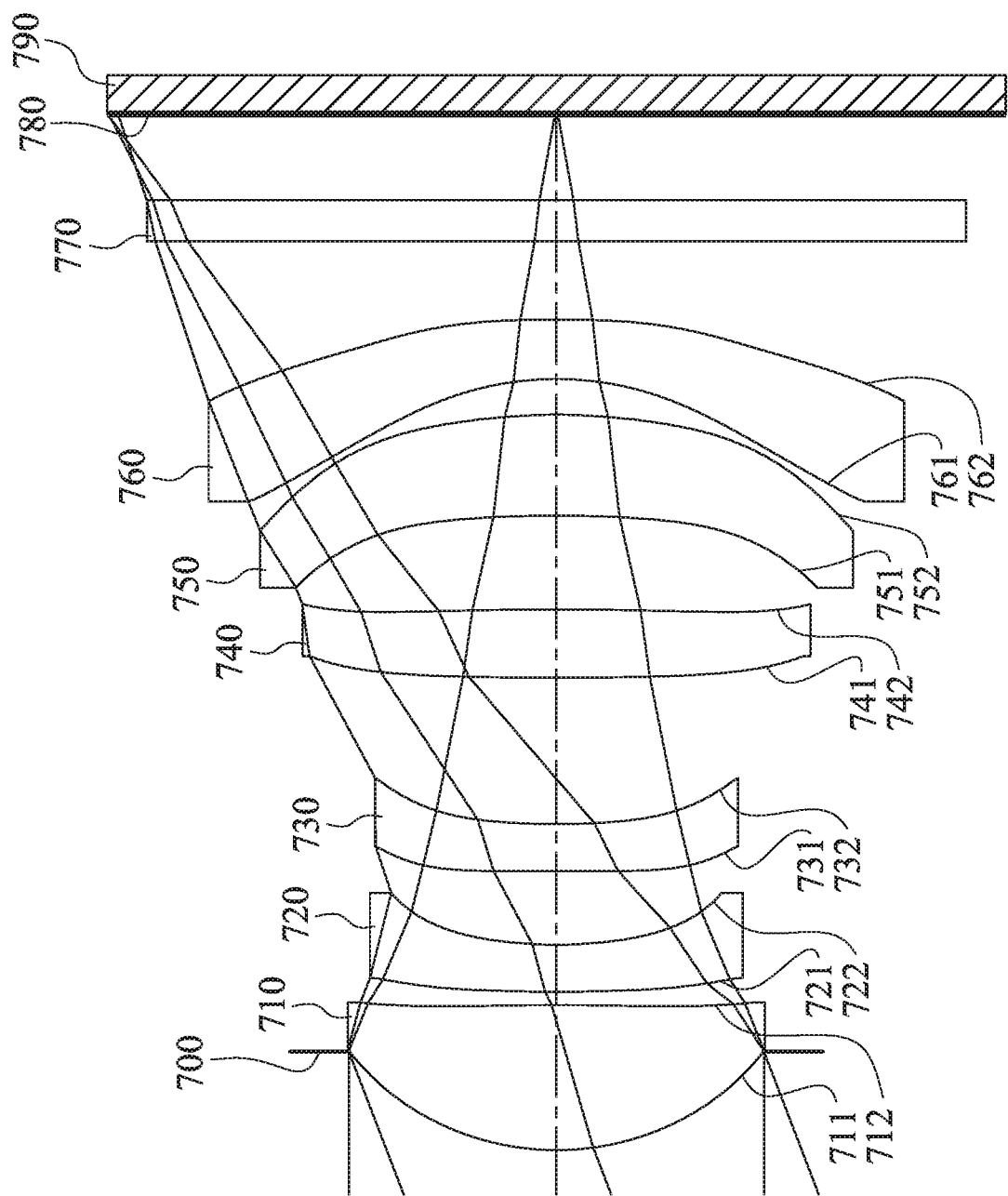
FIG. 13 is a schematic view of an image capturing device according to the 7th embodiment of the present disclosure.
Figure 14:
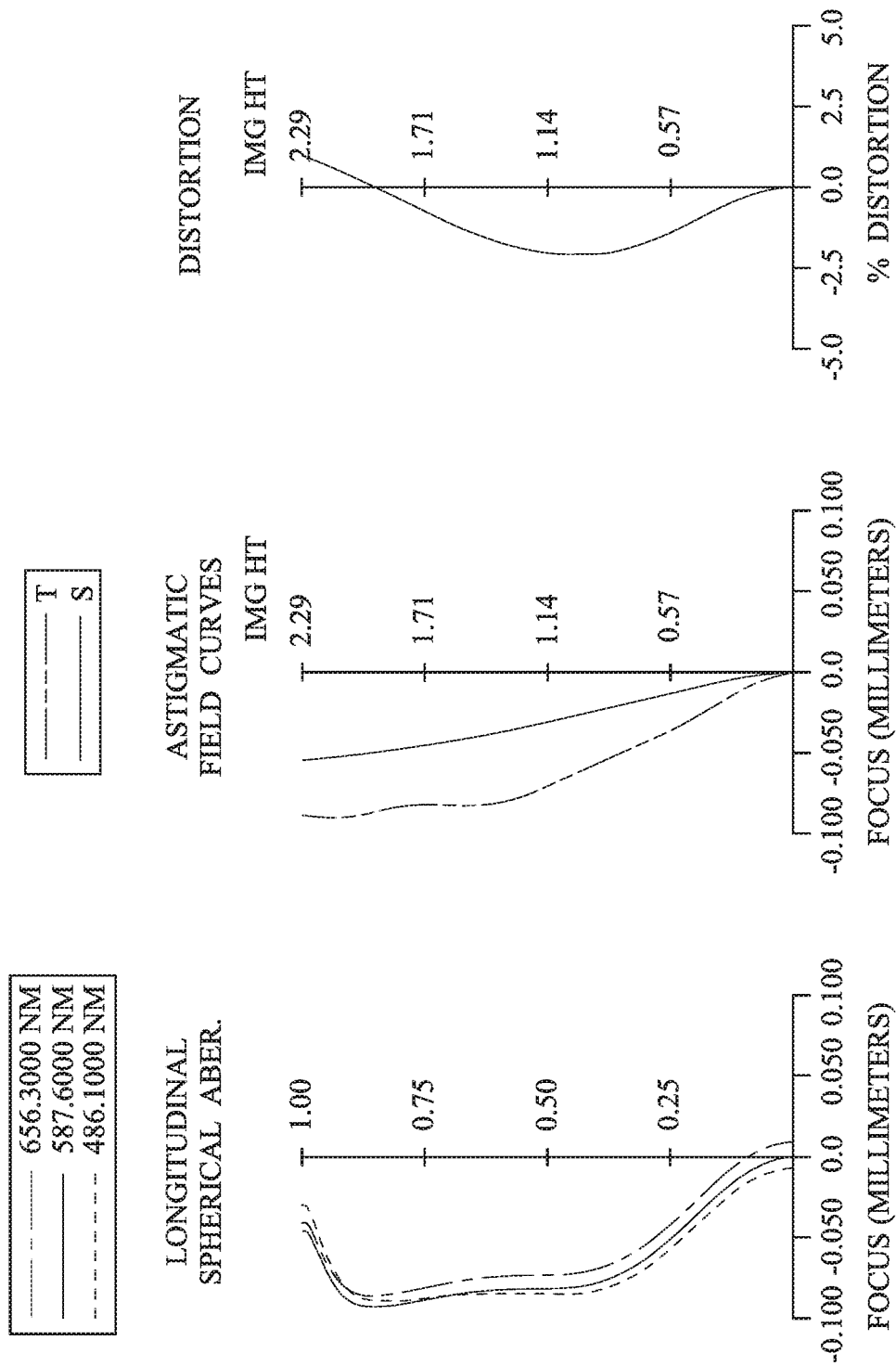
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes a photographing optical lens assembly (its reference numeral is omitted) and an image sensor 790. The photographing optical lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 770 and an image surface 780, wherein the image sensor 790 is disposed on the image surface 780 of the photographing optical lens assembly. The photographing optical lens assembly has a total of six lens elements (710-760) with refractive power. There is an air space in a paraxial region between any two of the first lens element 710, the second lens element 720, the third lens element 730, the fourth lens element 740, the fifth lens element 750, and the sixth lens element 760 that are adjacent to each other, and there is no relative displacement among the lens elements (710-760) with refractive power.

The first lens element 710 with positive refractive power has an object-side surface 711 being convex in a paraxial region thereof and an image-side surface 712 being convex in a paraxial region thereof. The first lens element 710 is made of glass material, and has the object-side surface 711 and the image-side surface 712 being both aspheric. Furthermore, the image-side surface 712 of the first lens element 710 includes at least one concave shape in an off-axial region thereof.

The second lens element 720 with negative refractive power has an object-side surface 721 being convex in a paraxial region thereof and an image-side surface 722 being concave in a paraxial region thereof. The second lens element 720 is made of plastic material, and has the object-side surface 721 and the image-side surface 722 being both aspheric.

The third lens element 730 with negative refractive power has an object-side surface 731 being concave in a paraxial region thereof and an image-side surface 732 being concave in a paraxial region thereof. The third lens element 730 is made of plastic material, and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material, and has the object-side surface 741 and the image-side surface 742 being both aspheric.

The fifth lens element 750 with positive refractive power has an object-side surface 751 being concave in a paraxial region thereof and an image-side surface 752 being convex in a paraxial region thereof. The fifth lens element 750 is made of plastic material, and has the object-side surface 751 and the image-side surface 752 being both aspheric.

The sixth lens element 760 with negative refractive power has an object-side surface 761 being concave in a paraxial region thereof and an image-side surface 762 being convex in a paraxial region thereof. The sixth lens element 760 is made of plastic material, and has the object-side surface 761 and the image-side surface 762 being both aspheric. Furthermore, the object-side surface 761 of the sixth lens element 760 includes at least one convex shape in an off-axial region thereof.

The IR-cut filter 770 is made of glass material and located between the sixth lens element 760 and the image surface 780, and will not affect a focal length of the photographing optical lens assembly.

The detailed optical data of the 7th embodiment are shown in Table 13 and the aspheric surface data are shown in Table 14 below.

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.01 | SD/TD | 0.88 |
| Fno | 2.84 | ΣAT/TD | 0.44 |

TABLE 13

7th Embodiment
f = 6.01 mm, Fno = 2.84, HFOV = 21.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.502 | | | | |
| 2 | Lens 1 | 1.399 | ASP | 0.740 | Glass | 1.540 | 59.7 | 2.44 |
| 3 | | −18.691 | ASP | 0.068 | | | | |
| 4 | Lens 2 | 7.179 | ASP | 0.240 | Plastic | 1.639 | 23.5 | −4.68 |
| 5 | | 2.084 | ASP | 0.377 | | | | |
| 6 | Lens 3 | −89.477 | ASP | 0.240 | Plastic | 1.544 | 55.9 | −7.54 |
| 7 | | 4.302 | ASP | 0.748 | | | | |
| 8 | Lens 4 | 32.121 | ASP | 0.348 | Plastic | 1.530 | 55.8 | 22.42 |
| 9 | | −18.792 | ASP | 0.480 | | | | |
| 10 | Lens 5 | −6.251 | ASP | 0.515 | Plastic | 1.650 | 21.4 | 7.80 |
| 11 | | −2.889 | ASP | 0.182 | | | | |
| 12 | Lens 6 | −1.624 | ASP | 0.303 | Plastic | 1.535 | 55.7 | −3.63 |
| 13 | | −10.519 | ASP | 0.400 | | | | |
| 14 | IR-cut filter | Plano | | 0.210 | Glass | 1.517 | 64.2 | — |
| 15 | | Plano | | 0.441 | | | | |
| 16 | Image | Plano | | — | | | | |

Note:
Reference wavelength is 587.6 nm (d-line).

TABLE 14

Aspheric Coefficients

| Surface # | | | | | |
|---|---|---|---|---|---|
| 2 | 3 | 4 | 5 | 6 | 7 |

| | | | | | |
|---|---|---|---|---|---|
| k = | −1.2424E−01 | −7.1368E+01 | 2.5745E+01 | 1.2664E+00 | 9.0000E+01 | 1.7494E+01 |
| A4 = | 1.7833E−02 | 4.2233E−03 | −1.1260E−01 | −1.1306E−01 | 8.2297E−02 | 1.0361E−01 |
| A6 = | −1.6863E−02 | 1.1745E−01 | 3.1890E−01 | 4.7259E−01 | 1.3632E−01 | 1.6699E−01 |
| A8 = | 4.7831E−02 | −1.9367E−01 | −3.4712E−01 | −5.2266E−01 | 4.3014E−02 | −3.1348E−01 |
| A10 = | −4.6814E−02 | 1.9263E−01 | 3.0395E−01 | 1.0140E+00 | 2.6677E−02 | 4.6277E−01 |
| A12 = | 2.3748E−02 | −8.2053E−02 | −1.7591E−01 | −6.8379E−01 | −1.2408E−01 | −3.3833E−01 |

| Surface # | | | | | |
|---|---|---|---|---|---|
| 8 | 9 | 10 | 11 | 12 | 13 |

| | | | | | |
|---|---|---|---|---|---|
| k = | 8.1769E+01 | 1.6376E+01 | 1.9446E+01 | −3.2014E+01 | −1.3373E+01 | −7.1541E+00 |
| A4 = | 1.9817E−02 | 6.9801E−03 | 2.9179E−02 | −5.8938E−03 | −3.4697E−01 | −2.5317E−01 |
| A6 = | 5.2101E−03 | 6.7154E−03 | −1.2480E−01 | −1.2779E−01 | 3.4664E−01 | 2.5999E−01 |
| A8 = | −1.6214E−04 | 3.1114E−03 | 7.9809E−02 | 9.5424E−02 | −1.7008E−01 | −1.3111E−01 |
| A10 = | 1.5099E−03 | −2.2673E−04 | −2.9983E−02 | −3.5913E−02 | 4.1232E−02 | 3.6197E−02 |
| A12 = | | | 6.0215E−03 | 5.6825E−03 | −3.8016E−03 | −5.3808E−03 |
| A14 = | | | 1.3508E−04 | −4.5709E−05 | 9.2328E−06 | 3.4221E−04 |

-continued

| 7th Embodiment | | | |
|---|---|---|---|
| HFOV [deg.] | 21.0 | TD/Dr6r9 | 2.69 |
| V5 | 21.4 | TD/f | 0.71 |
| Nmax | 1.650 | BL/f | 0.17 |
| (R7 − R8)/(R7 + R8) | 3.82 | \|Dsr1/Dsr2\| | 2.11 |
| (R10 + R11)/(R10 − R11) | 3.57 | SAG62 + GT6 [mm] | −0.11 |
| (R11 + R12)/(R11 − R12) | −1.37 | f/ImgH | 2.63 |
| f/R1 − f/R12 | 4.87 | EPD/ImgH | 0.93 |
| \|f/f1\| + \|f/f2\| + \|f/f6\| | 5.40 | TL/ImgH | 2.32 |

8th Embodiment

Figure 15:
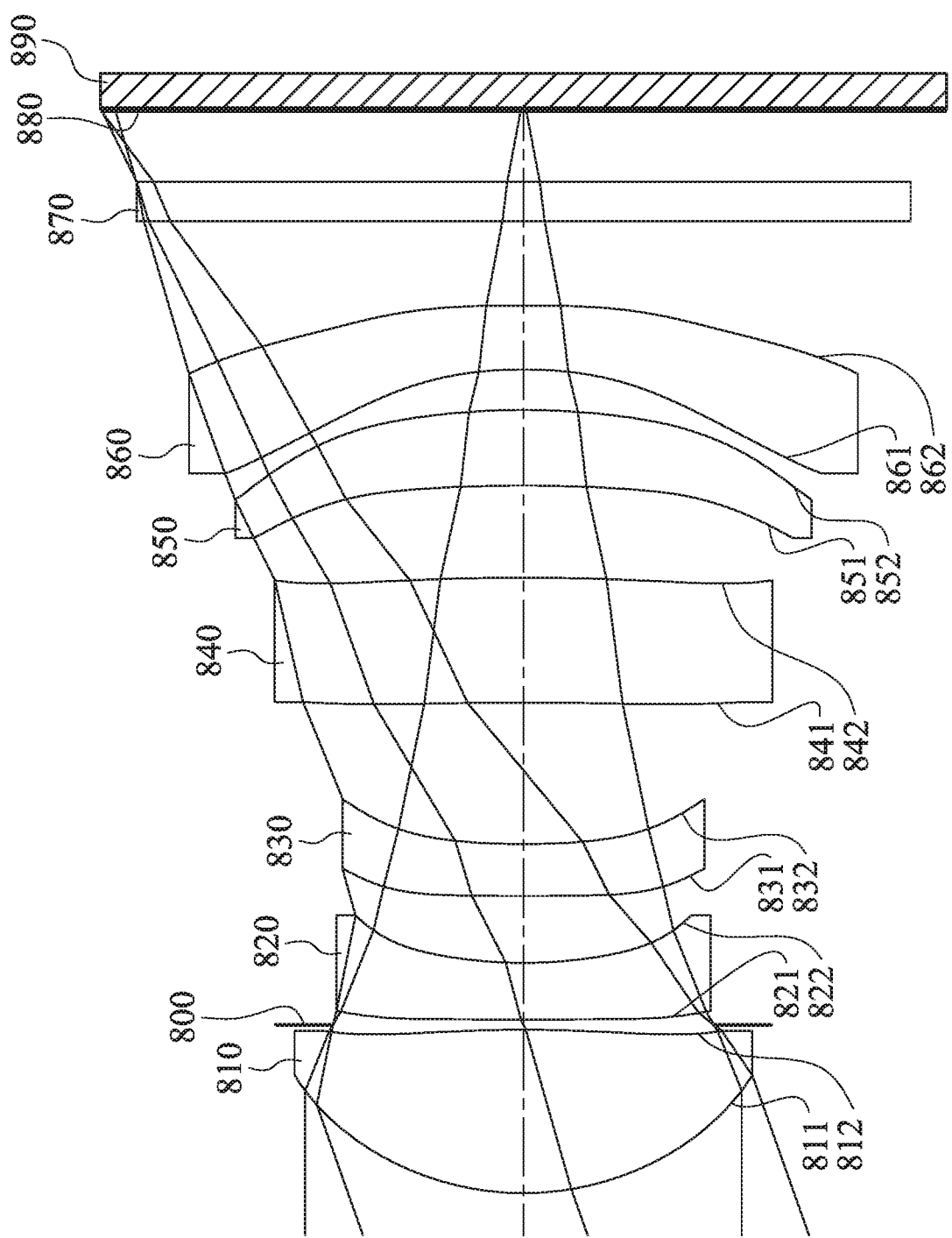
FIG. 15 is a schematic view of an image capturing device according to the 8th embodiment of the present disclosure.
Figure 16:
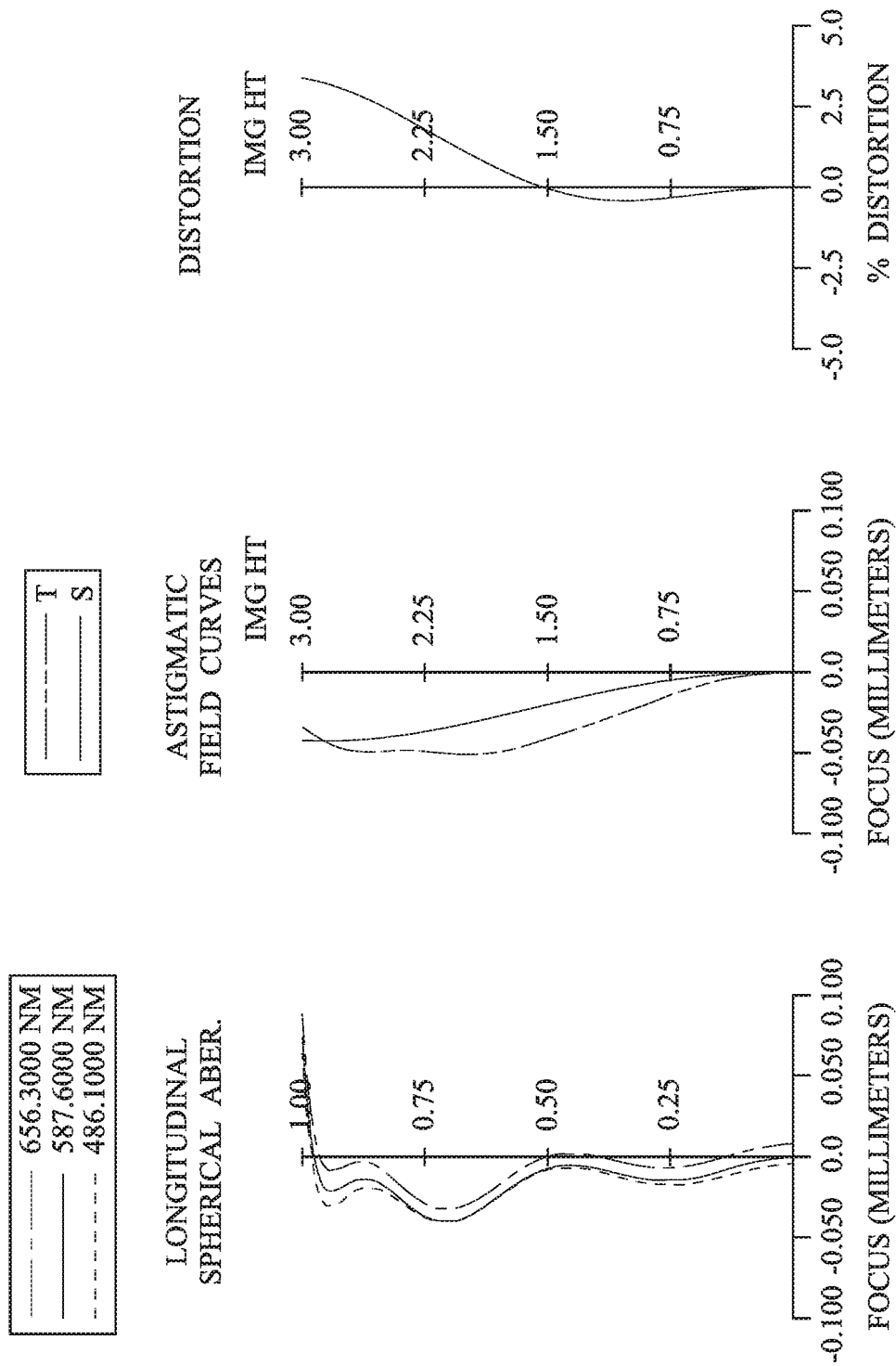
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes a photographing optical lens assembly (its reference numeral is omitted) and an image sensor 890. The photographing optical lens assembly includes, in order from an object side to an image side, a first lens element 810, an aperture stop 800, a second lens element 820, a third lens element 830, a fourth lens element 840, a fifth lens element 850, a sixth lens element 860, an IR-cut filter 870 and an image surface 880, wherein the image sensor 890 is disposed on the image surface 880 of the photographing optical lens assembly. The photographing optical lens assembly has a total of six lens elements (810-860) with refractive power. There is an air space in a paraxial region between any two of the first lens element 810, the second lens element 820, the third lens element 830, the fourth lens element 840, the fifth lens element 850, and the sixth lens element 860 that are adjacent to each other, and there is no relative displacement among the lens elements (810-860) with refractive power.

The first lens element 810 with positive refractive power has an object-side surface 811 being convex in a paraxial region thereof and an image-side surface 812 being convex in a paraxial region thereof. The first lens element 810 is made of plastic material, and has the object-side surface 811 and the image-side surface 812 being both aspheric. Furthermore, the image-side surface 812 of the first lens element 810 includes at least one concave shape in an off-axial region thereof.

The second lens element 820 with negative refractive power has an object-side surface 821 being convex in a paraxial region thereof and an image-side surface 822 being concave in a paraxial region thereof. The second lens element 820 is made of plastic material, and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material, and has the object-side surface 831 and the image-side surface 832 being both aspheric.

The fourth lens element 840 with positive refractive power has an object-side surface 841 being concave in a paraxial region thereof and an image-side surface 842 being convex in a paraxial region thereof. The fourth lens element 840 is made of plastic material, and has the object-side surface 841 and the image-side surface 842 being both aspheric.

The fifth lens element 850 with positive refractive power has an object-side surface 851 being concave in a paraxial region thereof and an image-side surface 852 being convex in a paraxial region thereof. The fifth lens element 850 is made of plastic material, and has the object-side surface 851 and the image-side surface 852 being both aspheric.

The sixth lens element 860 with negative refractive power has an object-side surface 861 being concave in a paraxial region thereof and an image-side surface 862 being convex in a paraxial region thereof. The sixth lens element 880 is made of plastic material, and has the object-side surface 861 and the image-side surface 862 being both aspheric. Furthermore, the object-side surface 861 of the sixth lens element 860 includes at least one convex shape in an off-axial region thereof.

The IR-cut filter 870 is made of glass material and located between the sixth lens element 860 and the image surface 880, and will not affect a focal length of the photographing optical lens assembly.

The detailed optical data of the 8th embodiment are shown in Table 15 and the aspheric surface data are shown in Table 16 below.

TABLE 15

8th Embodiment
f = 8.22 mm, Fno = 2.65, HFOV = 19.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.084 | ASP | 1.161 | Plastic | 1.544 | 55.9 | 3.28 |
| 2 | | −10.017 | ASP | 0.035 | | | | |
| 3 | Ape. Stop | Plano | | 0.037 | | | | |
| 4 | Lens 2 | 29.503 | ASP | 0.403 | Plastic | 1.639 | 23.5 | −5.55 |
| 5 | | 3.147 | ASP | 0.476 | | | | |
| 6 | Lens 3 | 66.502 | ASP | 0.369 | Plastic | 1.544 | 55.9 | −12.14 |
| 7 | | 5.999 | ASP | 1.005 | | | | |
| 8 | Lens 4 | −32.395 | ASP | 0.890 | Plastic | 1.514 | 56.8 | 58.94 |
| 9 | | −15.794 | ASP | 0.654 | | | | |
| 10 | Lens 5 | −10.305 | ASP | 0.538 | Plastic | 1.650 | 21.4 | 14.57 |
| 11 | | −5.035 | ASP | 0.287 | | | | |
| 12 | Lens 6 | −3.266 | ASP | 0.454 | Plastic | 1.535 | 55.7 | −7.08 |
| 13 | | −24.977 | ASP | 0.600 | | | | |
| 14 | IR-cut filter | Plano | | 0.280 | Glass | 1.517 | 64.2 | — |

TABLE 15-continued

8th Embodiment
f = 8.22 mm, Fno = 2.65, HFOV = 19.5 deg.

| Surface # | | Curvature Radius | Thickness | Material | Index | Abbe # | Focal Length |
|---|---|---|---|---|---|---|---|
| 15 | | Plano | 0.513 | | | | |
| 16 | Image | Plano | — | | | | |

Note:
Reference wavelength is 587.6 nm (d-line).

TABLE 16

Aspheric Coefficients

| | Surface # | | | | | |
|---|---|---|---|---|---|---|
| | 1 | 2 | 4 | 5 | 6 | 7 |
| k = | −1.4948E−01 | −3.2920E+01 | −5.4431E+01 | 4.3644E−01 | 7.2256E+01 | 1.8014E+01 |
| A4 = | 5.0546E−03 | 1.2545E−03 | −4.4524E−02 | −4.8297E−02 | 3.2461E−02 | 4.3267E−02 |
| A6 = | −2.3207E−03 | 2.4069E−02 | 6.6924E−02 | 9.0658E−02 | 2.7135E−02 | 2.9822E−02 |
| A8 = | 4.7375E−03 | −2.0502E−02 | −3.8033E−02 | −5.4503E−02 | 2.7720E−03 | −3.5080E−02 |
| A10 = | −2.8541E−03 | 1.1152E−02 | 1.8586E−02 | 5.9610E−02 | 2.3807E−03 | 2.6032E−02 |
| A12 = | 6.8750E−04 | −2.3020E−03 | −4.8195E−03 | −2.2811E−02 | −3.8536E−03 | −9.6263E−03 |

| | Surface # | | | | | |
|---|---|---|---|---|---|---|
| | 8 | 9 | 10 | 11 | 12 | 13 |
| k = | −6.5135E+01 | 8.0905E+00 | 2.3301E+01 | −2.0741E+01 | −1.7252E+01 | 3.7102E+01 |
| A4 = | 3.2821E−03 | 1.6914E−03 | 1.9234E−02 | 4.7222E−03 | −1.3404E−01 | −9.6600E−02 |
| A6 = | 2.3665E−03 | 1.1639E−03 | −2.5360E−02 | −2.6174E−02 | 7.1202E−02 | 5.2990E−02 |
| A8 = | −3.2968E−04 | 3.5613E−04 | 8.7462E−03 | 1.0374E−02 | −1.8493E−02 | −1.4270E−02 |
| A10 = | −1.9637E−05 | −9.7043E−06 | −1.7264E−03 | −2.0701E−03 | 2.3822E−03 | 2.0920E−03 |
| A12 = | | | 1.8181E−04 | 1.7627E−04 | −1.1652E−04 | −1.6468E−04 |
| A14 = | | | −5.8729E−07 | −1.1150E−07 | 1.2989E−07 | 5.5464E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 8.22 | SD/TD | 0.81 |
| Fno | 2.65 | ΣAT/TD | 0.40 |
| HFOV [deg.] | 19.5 | TD/Dr6r9 | 2.48 |
| V5 | 21.4 | TD/f | 0.77 |
| Nmax | 1.650 | BL/f | 0.17 |
| (R7 − R8)/(R7 + R8) | 0.34 | \|Dsr1/Dsr2\| | 34.17 |
| (R10 + R11)/(R10 − R11) | 4.69 | SAG62 + CT6 [mm] | −0.03 |
| (R11 + R12)/(R11 − R12) | −1.30 | f/ImgH | 2.74 |
| f/R1 − f/R12 | 4.27 | EPD/ImgH | 1.03 |
| \|f/f1\| + \|f/f2\| + \|f/f6\| | 5.15 | TL/ImgH | 2.57 |

9th Embodiment

Figure 20:
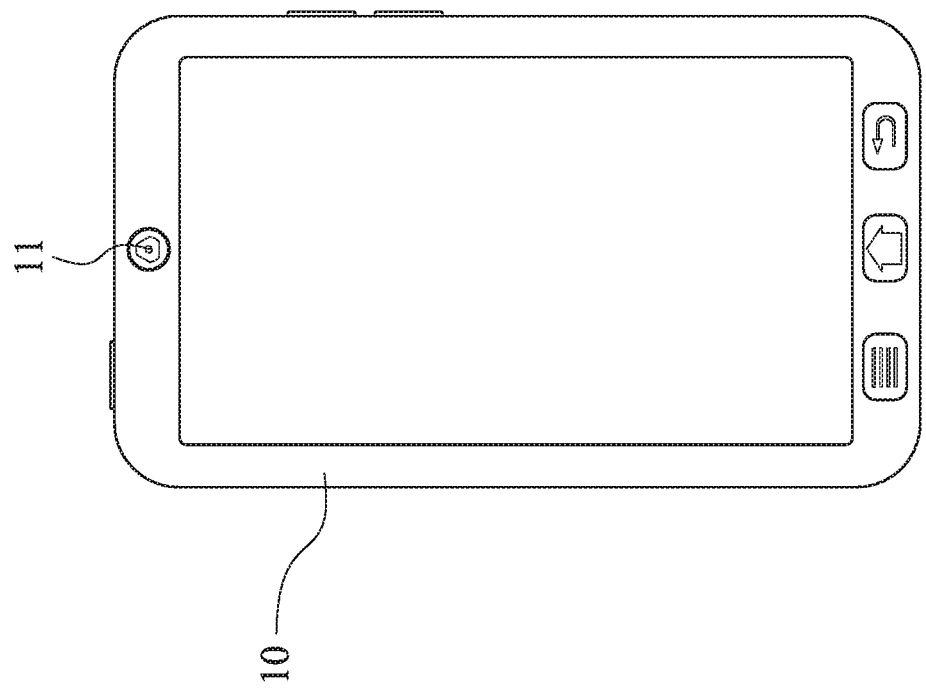
FIG. 20 is a schematic view of an electronic device according to the 9th embodiment of the present disclosure.

FIG. 20 is a schematic view of an electronic device 10 according to the 9th embodiment of the present disclosure. The electronic device 10 of the 9th embodiment is a smart phone, wherein the electronic device 10 includes an image capturing device 11. The image capturing device 11 includes a photographing optical lens assembly (its reference numeral is omitted) according to the present disclosure and an image sensor (its reference numeral is omitted), wherein the image sensor is disposed on an image surface of the photographing optical lens assembly.

10th Embodiment

Figure 21:
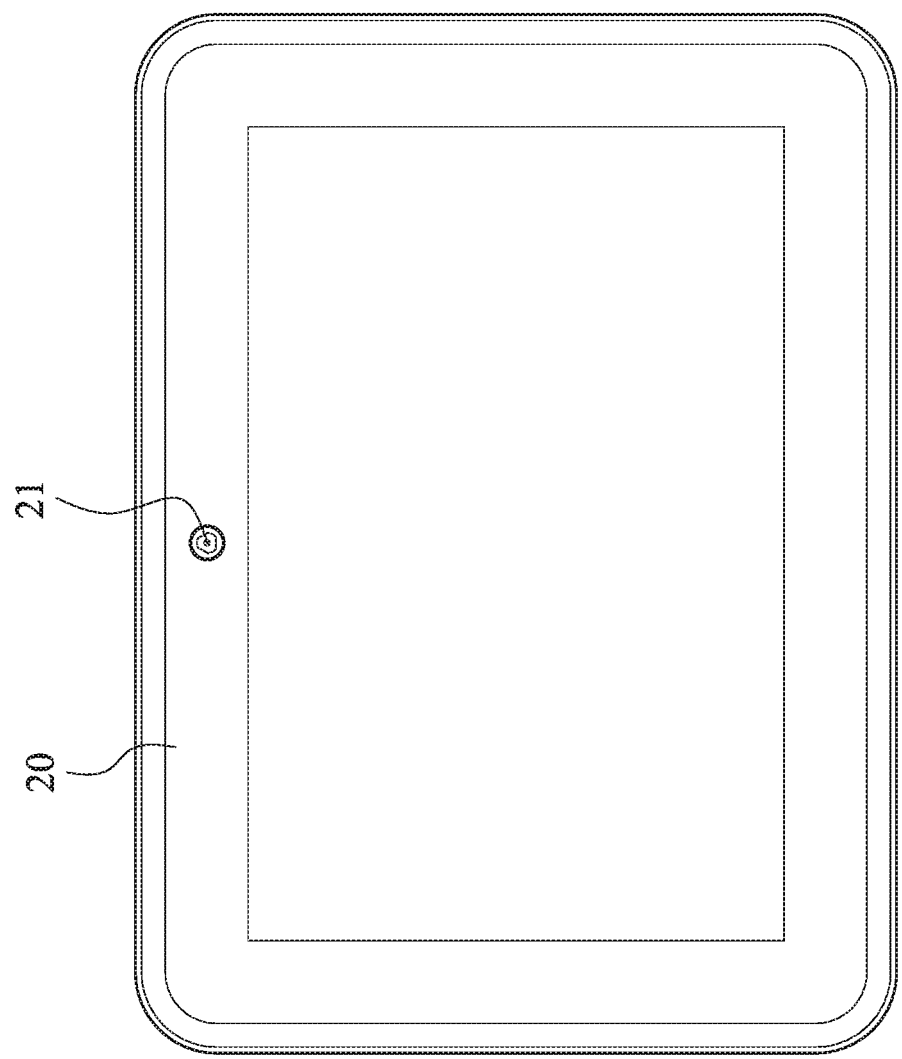
FIG. 21 is a schematic view of an electronic device according to the 10th embodiment of the present disclosure.

FIG. 21 is a schematic view of an electronic device 20 according to the 10th embodiment of the present disclosure. The electronic device 20 of the 10th embodiment is a tablet personal computer, wherein the electronic device 20 includes an image capturing device 21. The image capturing device 21 includes a photographing optical lens assembly (its reference numeral is omitted) according to the present disclosure and an image sensor (its reference numeral is omitted), wherein the image sensor is disposed on an image surface of the photographing optical lens assembly.

11th Embodiment

Figure 22:
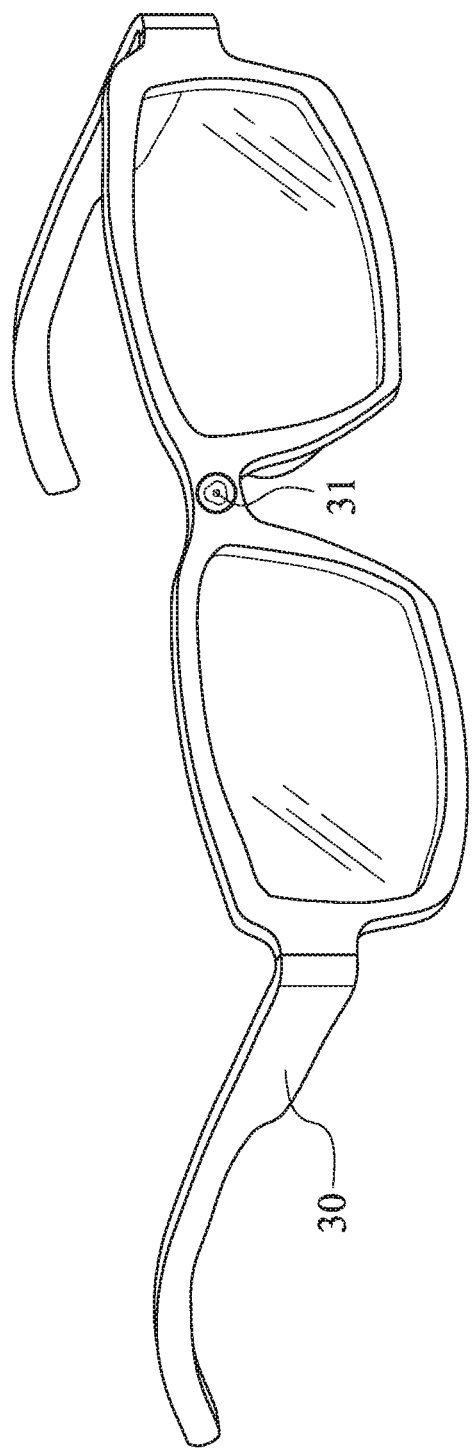
FIG. 22 is a schematic view of an electronic device according to the 11th embodiment of the present disclosure.

FIG. 22 is a schematic view of an electronic device 30 according to the 11th embodiment of the present disclosure. The electronic device 30 of the 11th embodiment is a head-mounted display (HMD), wherein the electronic device 30 includes an image capturing device 31. The image capturing device 31 includes a photographing optical lens assembly (its reference numeral is omitted) according to the present disclosure and an image sensor (its reference numeral is omitted), wherein the image sensor is disposed on an image surface of the photographing optical lens assembly.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising six lens elements, the six lens elements being, in order from an object side to an image side:
   a first lens element, a second lens element, a third lens element, a fourth lens element, a fifth lens element and a sixth lens element;
   wherein each of the six lens elements has an object-side surface towards the object side and an image-side surface towards the image side;
   wherein the sixth lens element with negative refractive power has an object-side surface being concave in a paraxial region thereof and an image-side surface being convex in a paraxial region thereof;
   wherein a central thickness of the first lens element is a maximum among central thicknesses of the six lens elements; a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a maximum of N1, N2, N3, N4, N5 and N6 is Nmax, an Abbe number of the fifth lens element is V5, a focal length of the photographing optical lens assembly is f, a curvature radius of an object-side surface of the first lens element is R1, a curvature radius of the image-side surface of the sixth lens element is R12, a maximum image height of the photographing optical lens assembly is ImgH, an entrance pupil diameter of the photographing optical lens assembly is EPD, and the following conditions are satisfied:

$N$max<1.70;

$V$5<30;

$4.0<f/R1-f/R12<8.5$;

$2.0<f/ImgH<5.0$; and $0.8<EPD/ImgH<2.0$.

2. The photographing optical lens assembly of claim 1, wherein the first lens element with positive refractive power has the object-side surface being convex in a paraxial region thereof; the second lens element with negative refractive power has an object-side surface being convex in a paraxial region thereof and an image-side surface being concave in a paraxial region thereof.

3. The photographing optical lens assembly of claim 1, wherein the fifth lens element with positive refractive power has an object-side surface being concave in a paraxial region thereof and an image-side surface being convex in a paraxial region thereof.

4. The photographing optical lens assembly of claim 1, wherein the fourth lens element has negative refractive power; a curvature radius of the object-side surface of the sixth lens element is R11, the curvature radius of the image-side surface of the sixth lens element is R12, and the following condition is satisfied:

$(R11+R12)/(R11-R12)<-1.0$.

5. The photographing optical lens assembly of claim 1, wherein a half of a maximal field of view of the photographing optical lens assembly is HFOV, the Abbe number of the fifth lens element is V5, and the following conditions are satisfied:

7.5 degrees<HFOV<23.5 degrees; and $V5≤23.5$.

6. A photographing optical lens assembly comprising six lens elements, the six lens elements being, in order from an object side to an image side:
   a first lens element, a second lens element, a third lens element, a fourth lens element, a fifth lens element and a sixth lens element;
   wherein each of the six lens elements has an object-side surface towards the object side and an image-side surface towards the image side;
   wherein the sixth lens element with negative refractive power has an object-side surface being concave in a paraxial region thereof and an image-side surface being convex in a paraxial region thereof;
   wherein a central thickness of the first lens element is a maximum among central thicknesses of the six lens elements, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a maximum of N1, N2, N3, N4, N5 and N6 is Nmax, an Abbe number of the fifth lens element is V5, an entrance pupil diameter of the photographing optical lens assembly is EPD, a maximum image height of the photographing optical lens assembly is ImgH, a focal length of the photographing optical lens assembly is f, and the following conditions are satisfied:

$N$max<1.70;

$V$5<30;

$0.8<EPD/ImgH<2.0$; and $2.0<f/ImgH<5.0$.

7. The photographing optical lens assembly of claim 6, wherein the first lens element with positive refractive power has an object-side surface being convex in a paraxial region thereof; the second lens element with negative refractive power has an image-side surface being concave in a paraxial region thereof; the fifth lens element has positive refractive power.

8. The photographing optical lens assembly of claim 6, wherein each of at least two of the first lens element, the second lens element and the third lens element has an object-side surface being convex in a paraxial region thereof and an image-side surface being concave in a paraxial region thereof.

9. The photographing optical lens assembly of claim 6, wherein a half of a maximal field of view of the photographing optical lens assembly is HFOV, and the following condition is satisfied:

7.5 degrees<HFOV≤16.8 degrees.

10. The photographing optical lens assembly of claim 6, wherein the focal length of the photographing optical lens assembly is f, a focal length of the first lens element is f1, a focal length of the second lens element is f2, a focal length of the sixth lens element is f6, and the following condition is satisfied:

5.0<|f/f1|+|f/f2|+|f/f6|.

11. The photographing optical lens assembly of claim 6, further comprising:
  an aperture stop, wherein an axial distance between the aperture stop and an object-side surface of the first lens element is Dsr1, an axial distance between the aperture stop and an image-side surface of the first lens element is Dsr2, and the following condition is satisfied:

1.40<|Dsr1/Dsr2|.

12. The photographing optical lens assembly of claim 6, wherein an axial distance between an object-side surface of the first lens element and the image-side surface of the sixth lens element is TD, the focal length of the photographing optical lens assembly is f, and the following condition is satisfied:

0.30<TD/f<0.85.

13. A photographing optical lens assembly comprising six lens elements, the six lens elements being, in order from an object side to an image side:
  a first lens element, a second lens element, a third lens element, a fourth lens element, a fifth lens element and a sixth lens element;
  wherein each of the six lens elements has an object-side surface towards the object side and an image-side surface towards the image side;
  wherein the second lens element with negative refractive power has an object-side surface being convex in a paraxial region thereof and an image-side surface being concave in a paraxial region thereof; the fifth lens element has positive refractive power; the sixth lens element with negative refractive power has an image-side surface being aspheric;
  wherein a central thickness of the first lens element is a maximum among central thicknesses of the six lens elements, there is an air space between each of adjacent lens elements of the six lens elements; a focal length of the photographing optical lens assembly is f, a curvature radius of an object-side surface of the first lens element is R1, a curvature radius of the image-side surface of the sixth lens element is R12, a maximum image height of the photographing optical lens assembly is ImgH, an entrance pupil diameter of the photographing optical lens assembly is EPD, and the following conditions are satisfied:

4.0<f/R1−f/R12<8.5;

2.0<f/ImgH<5.0; and 0.8<EPD/ImgH<2.0.

14. The photographing optical lens assembly of claim 13, wherein the first lens element with positive refractive power has the object-side surface being convex in a paraxial region thereof; the fourth lens element has an object-side surface being concave in a paraxial region thereof; the sixth lens element is made of plastic material.

15. The photographing optical lens assembly of claim 13, wherein the third lens element with positive refractive power has an object-side surface being convex in a paraxial region thereof.

16. The photographing optical lens assembly of claim 13, wherein each of at least two of the first lens element, the second lens element and the third lens element has an object-side surface being convex in a paraxial region thereof and an image-side surface being concave in a paraxial region thereof; a half of a maximal field of view of the photographing optical lens assembly is HFOV, and the following condition is satisfied:

7.5 degrees<HFOV≤16.3 degrees.

17. The photographing optical lens assembly of claim 13, wherein an Abbe number of the fifth lens element is V5, and the following condition is satisfied:

V5≤21.4.

18. The photographing optical lens assembly of claim 13, wherein an axial distance between the object-side surface of the first lens element and the image-side surface of the sixth lens element is TD, the focal length of the photographing optical lens assembly is f, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a maximum of N1, N2, N3, N4, N5 and N6 is Nmax, and the following conditions are satisfied:

0.30<TD/f<0.85; and 1.639≤Nmax<1.70.

19. The photographing optical lens assembly of claim 13, wherein an axial distance between the object-side surface of the first lens element and the image-side surface of the sixth lens element is TD, an axial distance between the image-side surface of the third lens element and the object-side surface of the fifth lens element is Dr6r9, and the following condition is satisfied:

TD/Dr6r9<3.1.

20. The photographing optical lens assembly of claim 13, wherein the sixth lens element has an object-side surface having a surface shape change from concave to convex between a paraxial region and an off-axial region thereof.

21. An image capturing device, comprising:
  the photographing optical lens assembly of claim 13; and
  a prism disposed on an optical path of the photographing optical lens assembly.

22. An image capturing device, comprising:
  the photographing optical lens assembly of claim 13; and
  an image sensor disposed on an image surface of the photographing optical lens assembly.

23. An electronic device, comprising:
  the image capturing device of claim 22.

24. A photographing optical lens assembly comprising six lens elements, the six lens elements being, in order from an object side to an image side:

a first lens element, a second lens element, a third lens element, a fourth lens element, a fifth lens element and a sixth lens element;

wherein each of the six lens elements has an object-side surface towards the object side and an image-side surface towards the image side;

wherein the first lens element has positive refractive power; the fourth lens element with negative refractive power has an image-side surface being concave in a paraxial region thereof; the fifth lens element has an object-side surface being concave in a paraxial region thereof; the sixth lens element with negative refractive power has an object-side surface being concave in a paraxial region thereof and an image-side surface being convex in a paraxial region thereof;

wherein an absolute value of a curvature radius of an object-side surface of the second lens element is larger than an absolute value of a curvature radius of an image-side surface of the second lens element; an Abbe number of the fifth lens element is V5, a focal length of the photographing optical lens assembly is f, a maximum image height of the photographing optical lens assembly is ImgH, an entrance pupil diameter of the photographing optical lens assembly is EPD, and the following conditions are satisfied:

$V5<30$;

$2.0<f/ImgH<5.0$; and $0.8<EPD/ImgH<2.0$.

25. The photographing optical lens assembly of claim 24, wherein the second lens element has negative refractive power; the fifth lens element with positive refractive power has an image-side surface being convex in a paraxial region thereof.

26. The photographing optical lens assembly of claim 24, wherein the Abbe number of the fifth lens element is V5, and the following condition is satisfied:

$V5 \leq 21.4$.

27. The photographing optical lens assembly of claim 24, wherein a half of a maximal field of view of the photographing optical lens assembly is HFOV, a curvature radius of the object-side surface of the sixth lens element is R11, a curvature radius of the image-side surface of the sixth lens element is R12, and the following conditions are satisfied:

7.5 degrees<HFOV<23.5 degrees; and $(R11+R12)/(R11-R12)<-1.0$.

28. The photographing optical lens assembly of claim 24, further comprising:

an aperture stop, wherein an axial distance between the aperture stop and an object-side surface of the first lens element is Dsr1, an axial distance between the aperture stop and an image-side surface of the first lens element is Dsr2, the focal length of the photographing optical lens assembly is f, a focal length of the first lens element is f1, a focal length of the second lens element is f2, a focal length of the sixth lens element is f6, and the following conditions are satisfied:

$1.40<|Dsr1/Dsr2|$; and $5.0<|f/f1|+|f/f2|+|f/f6|$.

* * * * *